US012027935B2

(12) United States Patent
Takahashi et al.

(10) Patent No.: US 12,027,935 B2
(45) Date of Patent: Jul. 2, 2024

(54) VIBRATION ACTUATOR AND VIBRATION PRESENTATION DEVICE

(71) Applicants: Yuki Takahashi, Tokyo (JP); Kazutaka Sakaguchi, Tokyo (JP); Tomoya Ishitani, Tokyo (JP)

(72) Inventors: Yuki Takahashi, Tokyo (JP); Kazutaka Sakaguchi, Tokyo (JP); Tomoya Ishitani, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 170 days.

(21) Appl. No.: 17/487,184

(22) Filed: Sep. 28, 2021

(65) Prior Publication Data

US 2022/0103055 A1   Mar. 31, 2022

(30) Foreign Application Priority Data

Sep. 29, 2020   (JP) ................................ 2020-164000

(51) Int. Cl.
| | | |
|---|---|---|
| *H02K 33/02* | (2006.01) | |
| *G06F 3/01* | (2006.01) | |
| *G06F 3/041* | (2006.01) | |
| *H01H 13/85* | (2006.01) | |
| *H02K 11/20* | (2016.01) | |
| *H02K 33/18* | (2006.01) | |

(52) U.S. Cl.
CPC ............ *H02K 33/18* (2013.01); *G06F 3/016* (2013.01); *G06F 3/041* (2013.01); *H01H 13/85* (2013.01); *H02K 11/20* (2016.01); *H02K 33/02* (2013.01)

(58) Field of Classification Search
CPC ......................................... H02K 33/00–33/18
See application file for complete search history.

(56) References Cited

U.S. PATENT DOCUMENTS

| | | | | |
|---|---|---|---|---|
| 5,409,101 A | * | 4/1995 | Ahmed ................... | H02K 33/16 |
| | | | | 198/750.1 |
| 2015/0169061 A1 | | 6/2015 | Odajima et al. | |
| 2020/0044546 A1 | | 2/2020 | Zhang | |
| 2020/0136488 A1 | | 4/2020 | Takahashi et al. | |

FOREIGN PATENT DOCUMENTS

| | | | | | |
|---|---|---|---|---|---|
| CN | 103703432 B | * | 3/2018 | ............ | G06F 3/016 |
| JP | 2015-070729 | | 4/2015 | | |
| JP | 2016-152685 | | 8/2016 | | |
| JP | 2016-163854 | | 9/2016 | | |
| JP | 2020-022355 | | 2/2020 | | |
| JP | 2020-069447 | | 5/2020 | | |

* cited by examiner

*Primary Examiner* — Ramon M Barrera

(57) ABSTRACT

A vibration actuator includes a fixing body including a base part, and a magnetic suction force generation part provided at a core on which a coil is wound; a movable body including a connecting part, and a suction part suctioned by the magnetic suction force generation part through energization to the coil; and a plurality of elastic support parts. The suction part is disposed in a vicinity of a magnetic pole of the core of the magnetic suction force generation part with an air gap between the suction part and the magnetic pole in a vibration direction, and the suction part is disposed at a center portion in the vibration direction of the movable body supported by the plurality of elastic support parts.

9 Claims, 29 Drawing Sheets

VIBRATION ACTUATOR AND VIBRATION PRESENTATION DEVICE

CROSS REFERENCE TO RELATED APPLICATIONS

This application is entitled to (or claims) the benefit of Japanese Patent Application No. 2020-164000, filed on Sep. 29, 2020, the disclosure of which including the specification, drawings and abstract is incorporated herein by reference in its entirety.

TECHNICAL FIELD

The present invention relates to a vibration actuator and a vibration presentation device including the same.

BACKGROUND ART

In the past, a configuration is known in which, when operating a touch panel, which is a sensing panel, a vibration actuator is used to apply vibration to the operator's fingertips or the like making contact with the display screen on the touch panel as a contact operation feeling (a feeling of operation by contact) (see PTL 1 and PTL 2).

PTL 1 discloses a mobile terminal device in which a vibration actuator is attached to the back of the touch panel through a vibration transmission unit. In this vibration actuator, a guide shaft extending in a direction perpendicular to the touch panel is provided in a housing fixed to the vibration transmission unit, and a movable body is arranged to move back and forth along the extending direction of the guide shaft. In this vibration actuator, the movable element is impacted against the housing in response to an operation on the touch panel, thereby imparting vibration to the finger belly making contact with the touch panel through the vibration transmission part.

In addition, PTL 2 discloses a vibration presentation device that provides vibrations in response to operations on a touch panel. In this vibration presentation device, a voice coil motor that generates vibration, a support part that is placed with the vibration panel and compressed by a predetermined force, a damper that provides a braking effect to the vibration of the vibration part, and a spring that provides a compressive force to the support part and the damper are interposed in parallel between the vibration panel, which is a vibration part that presents vibration, and a housing that supports the vibration panel.

CITATION LIST

Patent Literature

PTL 1
Japanese Patent Application Laid-Open No. 2015-070729
PTL 2
Japanese Patent Application Laid-Open No. 2016-163854

SUMMARY OF INVENTION

Technical Problem

In recent years, in a structure that provides a touch operation feeling to the operator's fingertips or the like making contact with the touch panel as described above, it has become desirable to reduce the size of the touch panel as well as to express the vibration serving as the contact operation feeling in accordance with the application and usage of the operating device. As a result, it is desirable to reduce the cost of the device itself and to make the device thinner while stably generating strong feedback as tactile feedback that serves as the contact operation feeling.

An object of the present invention is to provide a vibration actuator and a vibration presentation device that can achieve cost reduction and thickness reduction, and can stably and efficiently output a vibration suitable for the touch feeling feedback to the operator making a contact operation.

Solution to Problem

To solve the above-described problems, a vibration actuator configured to apply a vibration to a connected vibration presentation part, the vibration actuator including: a fixing body including a base part composed of a non-magnetic substance, and a magnetic suction force generation part provided at a core on which a coil is wound, the base part having a planar shape; a movable body including a connecting part connectable to the vibration presentation part, and a suction part composed of a magnetic material configured to be suctioned by the magnetic suction force generation part through energization to the coil, the movable body having a plate-shape and disposed on the base part; and a plurality of elastic support parts configured to support the movable body with respect to the fixing body such that the movable body is sandwiched from a vibration direction along a surface of the base part and that the movable body is movable in the vibration direction. The suction part is disposed in a vicinity of a magnetic pole of the core of the magnetic suction force generation part with an air gap between the suction part and the magnetic pole in the vibration direction, and the suction part is disposed at a center portion in the vibration direction of the movable body supported by the plurality of elastic support parts.

A vibration presentation device of the embodiment of the present invention includes a touch panel in which the vibration actuator is mounted.

Advantageous Effects of Invention

According to the present invention, it is possible to achieve cost reduction and thickness reduction, and efficiently output a vibration suitable for the touch feeling feedback to the operator making a contact operation.

DESCRIPTION OF EMBODIMENTS

Figure 1:
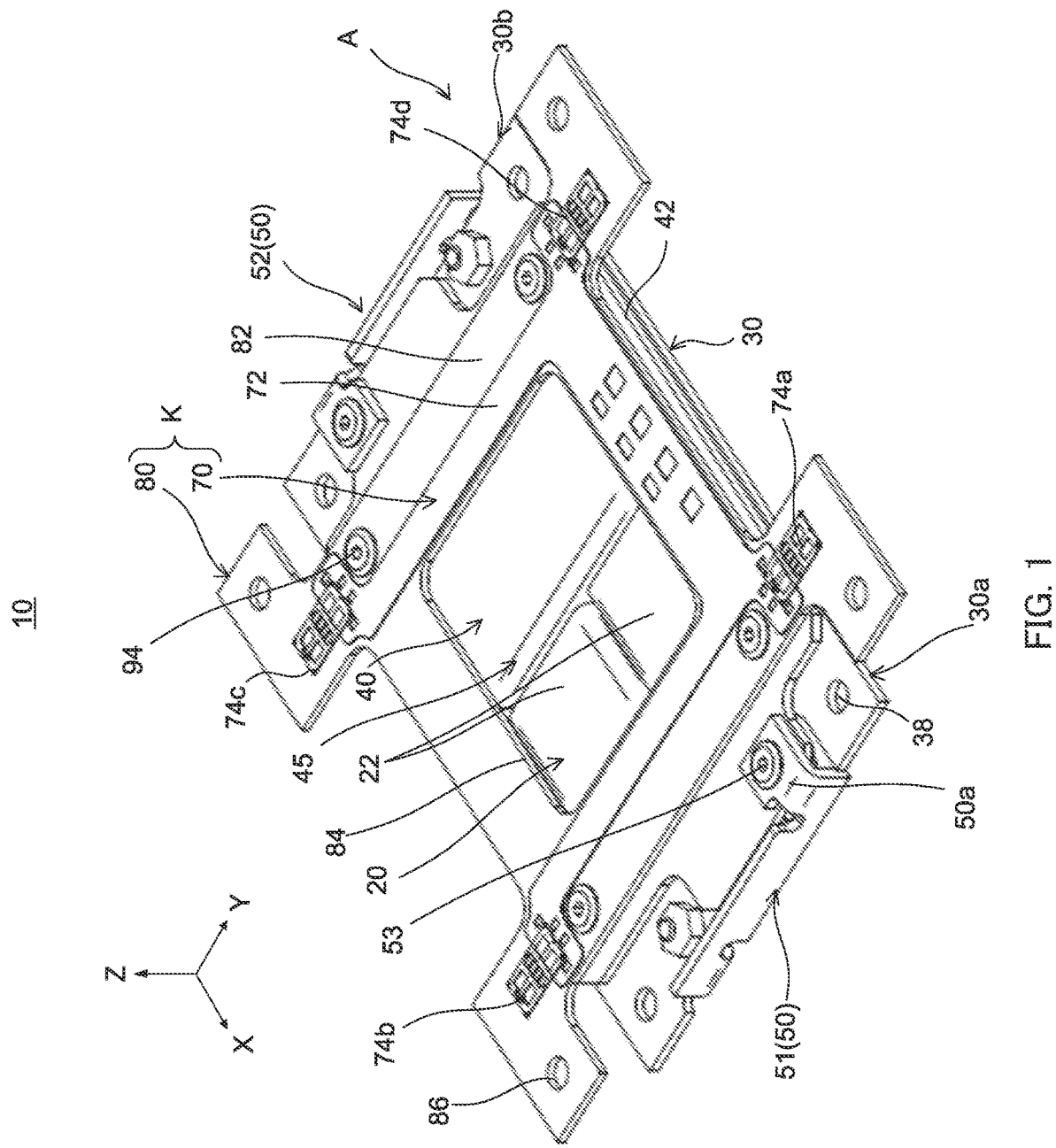
FIG. 1 is a perspective view of an external appearance of a vibration actuator according to Embodiment 1 of the present invention.
Figure 2:
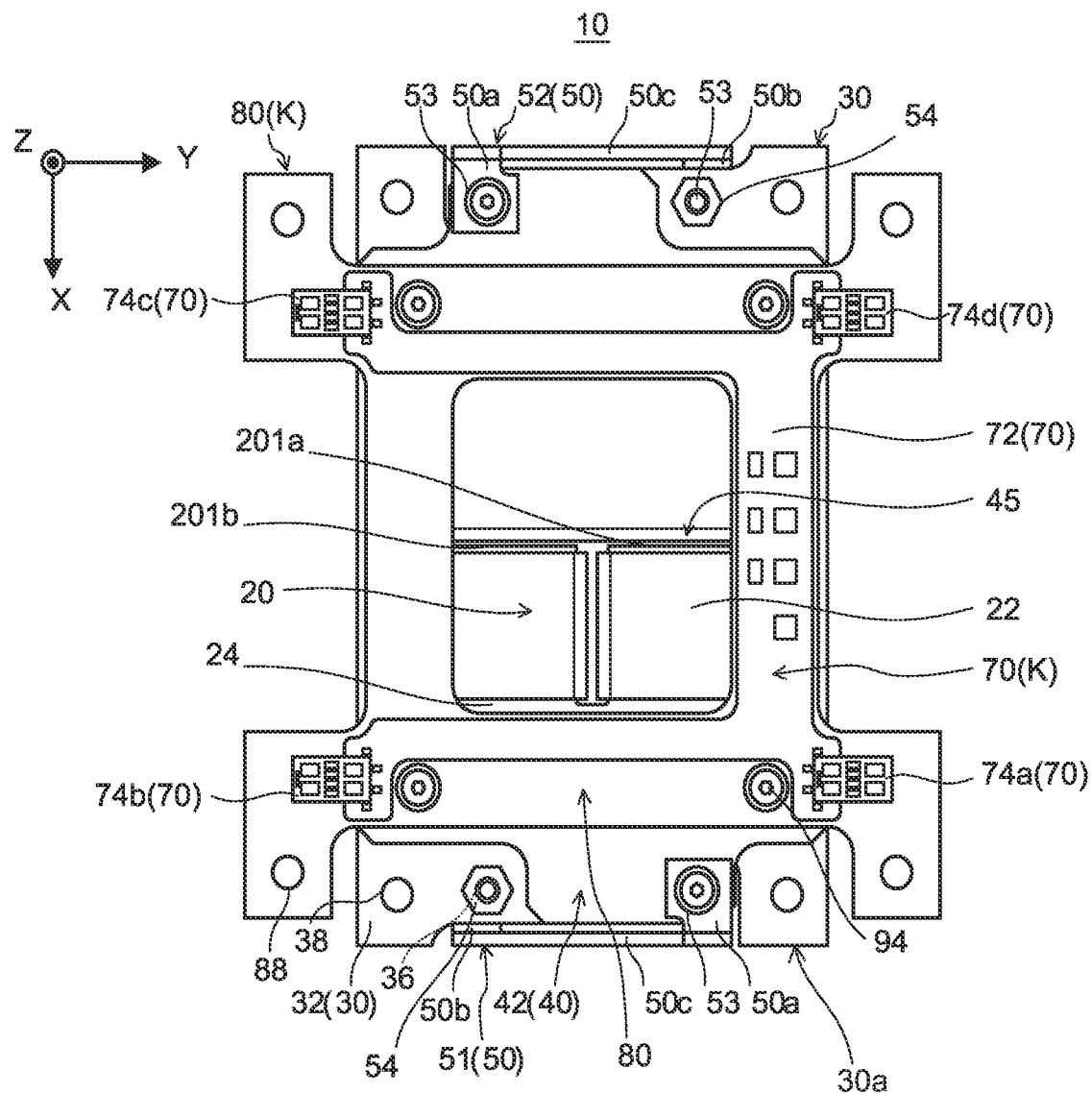
FIG. 2 is a plan view of the vibration actuator according to Embodiment 1 of the present invention.
Figure 3:
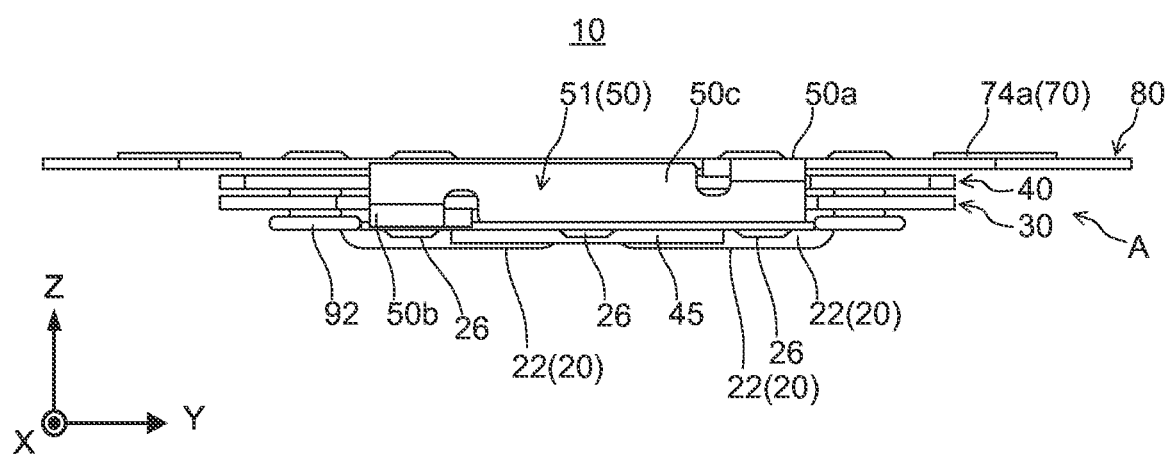
FIG. 3 is a front view of the vibration actuator according to Embodiment 1 of the present invention.
Figure 4:
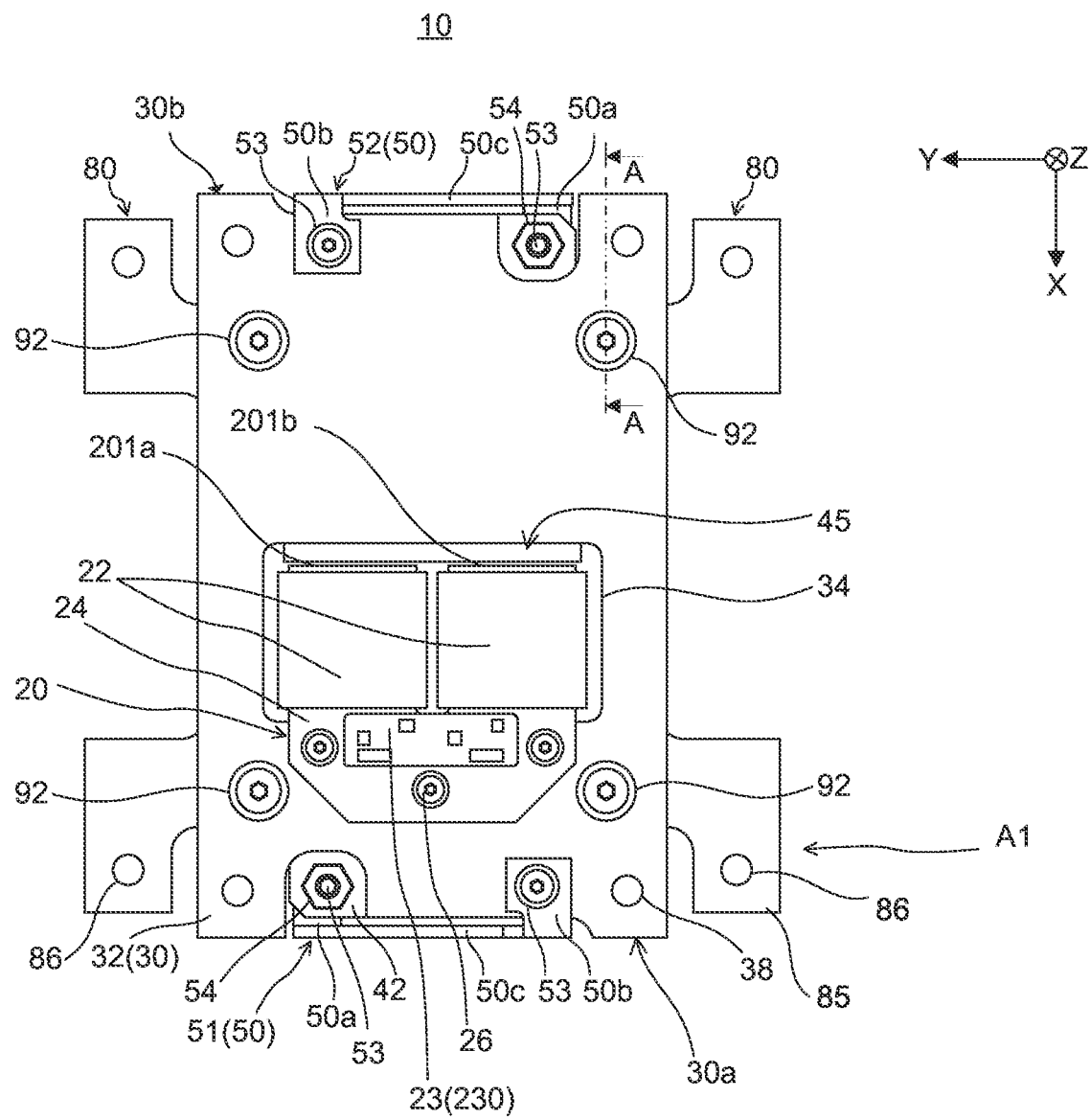
FIG. 4 is a back view of the vibration actuator according to Embodiment 1 of the present invention.

An embodiment of the present invention is elaborated below with reference to the accompanying drawings.

The present embodiment is described using an orthogonal coordinate system (X, Y, Z). The common orthogonal coordinate system (X, Y, Z) is used also in the drawings described later. In the following description, the depth, width, and height of vibration actuator 10 are the lengths in the X direction, the Y direction, and the Z direction, respectively. For convenience of description, the X direction (also referred to as the plus side in the X direction) is referred to as the front end side (one end side), the -X direction (also referred to as the minus side in the X direction) is referred to as the bottom end side (the other end side), and the X direction and the -X direction are referred to as the front-rear direction.

For example, vibration actuator 10 is used in vibration presentation device 200 (see FIG. 31), and produces a vibration in the plus-minus X direction as the feel of touch of a finger or the like touching the vibration presentation part by moving back and forth in the plus-minus X direction. The vibration presentation part is an operation device or the like such as a touch panel that are touched and operated by the operator. Vibration presentation device 200 applies a vibration to the operation device in accordance with a touching operation of the operator on the operation device. Specifically, it applies a touching operation feeling (also referred to as "touch feeling" and "force feeling") to the operator touching and operating the operation device through the operation device.

Embodiment 1

General Configuration of Vibration Actuator 10

FIG. 1 to FIG. 6 are a perspective view of an external appearance, a plan view, a front view, a back view, a right side view and an exploded perspective view of the vibration actuator according to Embodiment 1 of the present invention.

Vibration actuator 10 is a flat-plate shaped (card shaped) vibration actuator, and vibrates by moving a movable body in the direction orthogonal to the thickness direction, which is the Z direction. For example, when attached to a touch panel serving as the vibration presentation part, vibration actuator 10 is positioned at the rear surface of the touch panel in an opposite manner. Vibration actuator 10 vibrates in accordance with a press from the touch panel side and transmits the vibration to the touch panel side as a touch feeling feedback.

Vibration actuator 10 includes actuator main body A and load detection module K. Load detection module K includes strain member 80 and strain detector 70 provided at strain member 80.

Vibration actuator 10 is provided in a device (such as vibration presentation device 200 illustrated in FIG. 31) including a vibration presentation part such as a touch panel, for example. In this case, a strain of strain member 80 when the touch panel is pressed and operated is detected by strain detector 70. Vibration actuator 10 vibrates in accordance with the detection result of strain detector 70, and applies a vibration to the touch panel. In this manner, when the touch panel is operated, a touch feeling is given to the operator, or in other words, a touch feeling feedback is achieved, through the touch panel.

Actuator Main Body A

Figure 7:
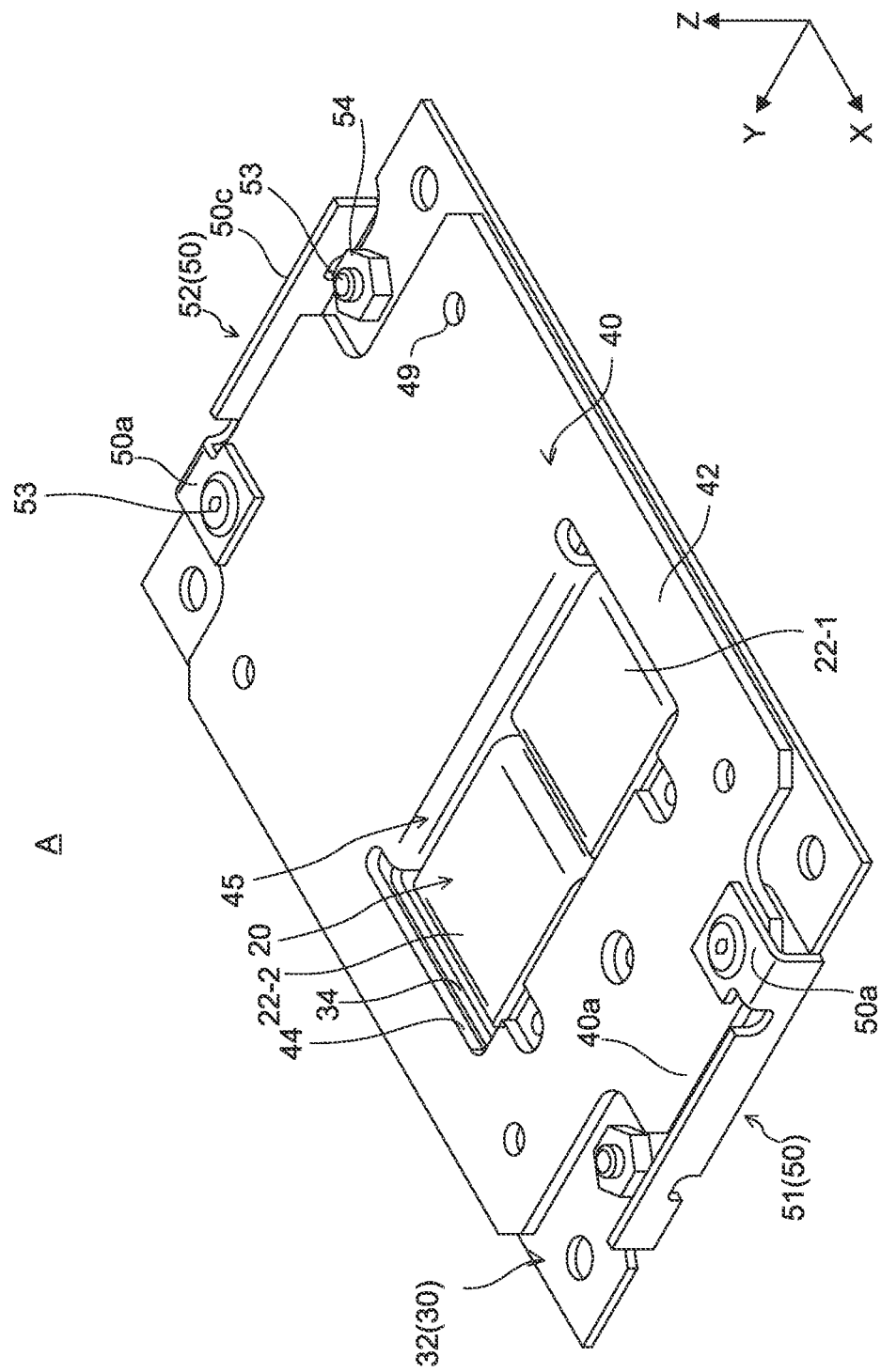
FIG. 7 is a perspective view of an actuator main body illustrating a support structure of an elastic support part.
Figure 8:
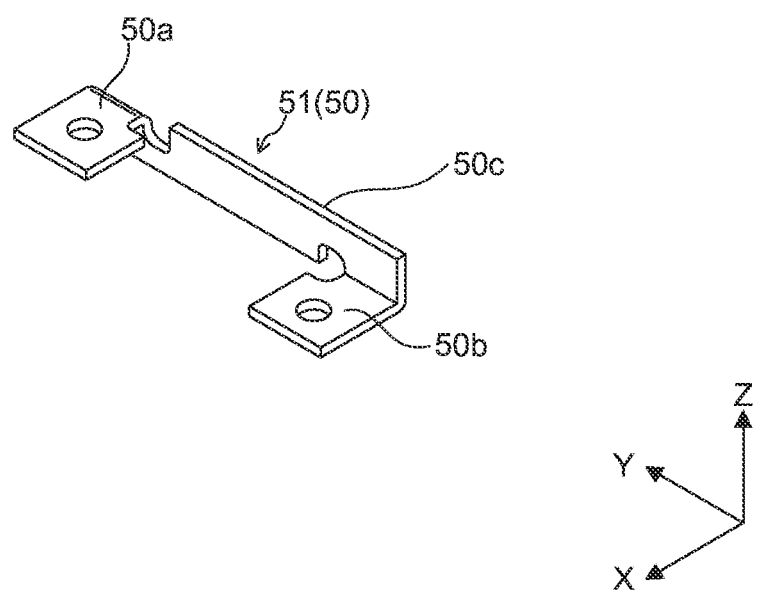
FIG. 8 is a perspective view of an elastic support part.

FIG. 7 is a perspective view of actuator main body A with a support structure of an elastic support part, and FIG. 8 is an enlarged view of the elastic support part.

In the present embodiment, actuator main body A illustrated in FIG. 1 to FIG. 7 is, for example, mounted in vibration presentation device (the electronic apparatus illustrated in FIG. 31) 200 together with microcomputer 220 serving as a control unit, and functions as a source of vibration of touch feeling presentation part (vibration presentation part) 210 as a touch panel as an example of the operation device.

Actuator main body A includes fixing body 30 including core assembly 20 composed of coil 22 (22-1, 22-2) wound on core 24 and base part 32, movable body 40 including magnetic substance movable body main body 42, and elastic support part 50 (51, 52).

Actuator main body A drives, in one direction (for example, the X direction or the −X direction), movable body 40 movably supported by elastic support part 50. The one direction is one of the directions orthogonal to the thickness direction of plate-shaped vibration actuator 10.

Actuator main body A moves movable body 40 in one direction against a biasing force of a member (elastic support part 50) that generates a biasing force, and actuator main body A moves movable body 40 moved in the one direction in the direction opposite to the one direction with the biasing force. Actuator main body A repeats this operation and thus functions as an electromagnetic actuator that moves (vibrates) back and forth movable body 40 in one direction.

With core assembly 20, actuator main body A vibrates movable body main body 42 of movable body 40. To be more specific, it vibrates movable body 40 with a suction force of core 24 excited by energized coil 22 and energized coil 22, and a biasing force of elastic support part 50 (51, 52).

Actuator main body A has a flat shape, and vibrates movable body 40 in the vibration direction as the X direction orthogonal to the Z direction as the thickness direction, with respect to fixing body 30.

In the present embodiment, with strain detection sensors 74a to 74d serving as a strain detection part, actuator main body A detects a displacement of a pressed and operated touch feeling presentation part (touch panel) as a strain of strain member 80, and moves and vibrates movable body 40 in accordance with the detected strain.

Fixing Body 30

In fixing body 30, core assembly 20 is fixed to a plate-shaped base part 32 serving as a fixing body main body, and elastic support part 50 (51, 52) coupled with movable body 40 is fixed. Elastic support part 50 (51, 52) supports movable body 40 such that movable body 40 is movable with respect to fixing body 30 in the vibration direction.

Base part 32 is a flat shaped member, and forms the bottom surface of actuator main body A, or in other words, the bottom surface of vibration actuator 10. Base part 32 is provided with opening 34, and core assembly 20 is fixed to base part 32 with securing member 26 such as a screw such that coils 22-1 and 22-2 are located in opening 34.

In base part 32, spring connecting part 36 (see FIG. 6) where first end parts 50b, 50b of elastic support part 50 (51, 52) is fixed is provided at base top end part 30a and base bottom end part 30b with core assembly 20 therebetween.

Base part 32 is formed such that the distance between spring connecting part 36 of base top end part 30a and the suction force generation part of core assembly 20, and the distance between spring connecting part 36 of base bottom end part 30b and the suction force generation part are substantially equal to each other. In the front-rear direction (vibration direction) of movable body main body 42, suction part 45 is disposed at a center portion between spring connecting parts 36, 36.

Suction part 45 located at a center portion between spring connecting parts 36, 36 in the front-rear direction (vibration direction) of movable body main body 42 means that suction part 45 located at a position at or near the center between elastic support parts 51 and 52 in the front-rear direction (vibration direction) of movable body main body 42.

In addition, the position at or near the center between elastic support parts 51 and 52 in the front-rear direction (vibration direction) of movable body main body 42 may be a position at or near the center between elastic deformation parts 50c of elastic support parts 51 and 52 and between movable body side fixing parts 50a in the front-rear direction (vibration direction) of movable body main body 42.

Figure 5:
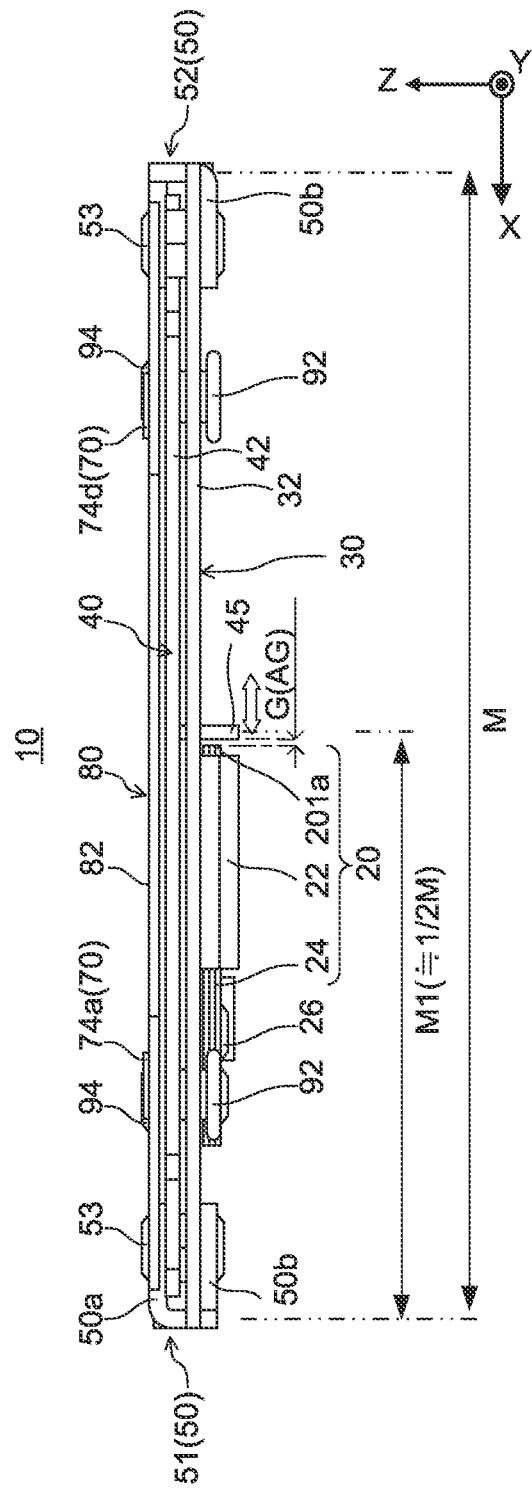
FIG. 5 is a diagram illustrating a right side surface of the vibration actuator according to Embodiment 1 of the present invention.

Suction part 45 is disposed in the vicinity of magnetic poles 201a and 201b of core 24 of the magnetic suction force generation part with air gap AG therebetween in the front-rear direction (vibration direction), at a center portion (at or near the center) in the vibration direction of movable body 40 supported by elastic support parts 51 and 52. For example, as illustrated in FIG. 5, suction part 45 is disposed at a position such that in the vibration direction (the X direction, the −X direction), length M1 from one of elastic support parts 51 and 52 is ½M or approximately ½M of length M between elastic support parts 51 and 52. In addition, length M between elastic support parts 51 and 52 may be the length between elastic deformation parts 50c or the length between the portions (50b) supported by elastic support parts 51 and 52 in movable body 40.

In addition, base top end part 30a and base bottom end part 30b are provided with fixation hole 38 for fixing base part 32 to the base side (omitted in the drawing). Each fixation hole 38 is provided in four corners of base part 32, and reliably fixes the base part to the base (omitted in the drawing).

Base part 32 is formed by processing a sheet metal into a rectangular plate-shape with base top end part 30a and base bottom end part 30b as one side portion and the other side portion in the vibration direction as the X direction, which is the longitudinal direction, for example.

Opening 34 has a shape that matches the shape of core assembly 20. Opening 34 is formed in a rectangular shape that is long in the width direction (the Y direction), and the suction force generation part of core assembly 20 is disposed opposite to suction part 45 of the movable body with a space therebetween in the vibration direction (the X direction) at a center portion of base part 32. It is to be noted that the configuration of opening 34 is not limited as long as coil 22 of core assembly 20 is disposed inside and the suction force generation part is opposite to suction part 45 in the vibration direction.

In opening 34, coil 22 of core assembly 20 is fixed from the bottom surface side of base part 32 (the surface on the side opposite to the top surface that is opposite to movable body 40). In this manner, in comparison with a configuration in which core assembly 20 is attached on base part 32, the length of the entire vibration actuator in the Z direction (thickness) is reduced. In addition, core assembly 20 is fixed with a screw as securing member 26 in the state where its part (in this case, a part of the bottom surface side) is fit in opening 34. In this manner, core assembly 20 is firmly fixed to base part 32 in a manner that it is not easily detached from base part 32.

When coil 22 is energized, core assembly 20 vibrates (moves back and forth in the X direction) movable body main body 42 of movable body 40 with a cooperation of elastic support part 50 (51, 52) and suction part 45.

Figure 9:
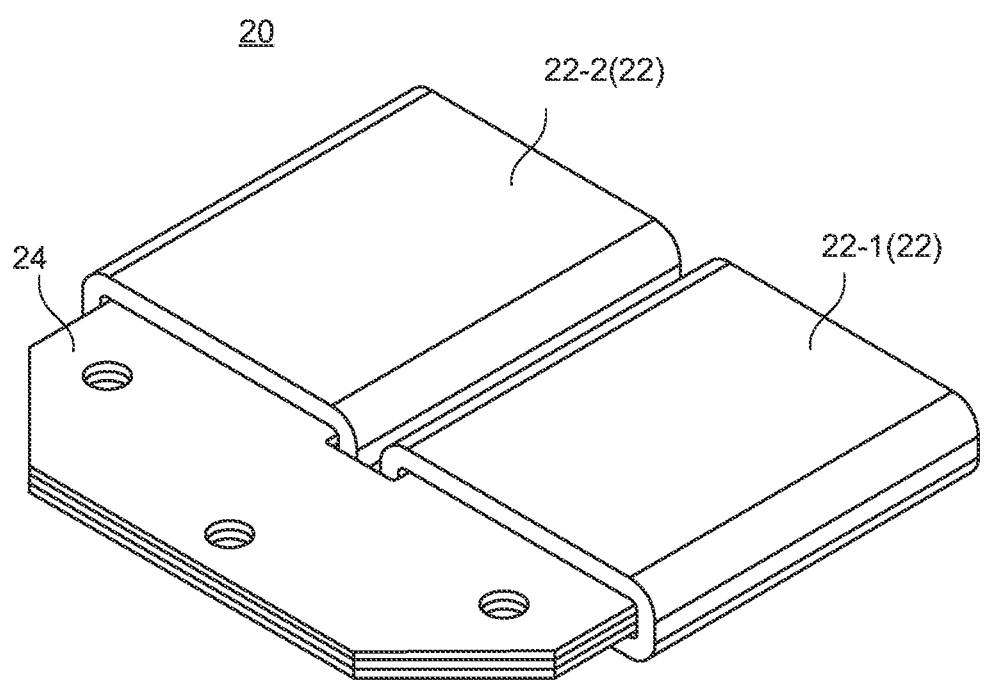
FIG. 9 is a perspective view illustrating an exemplary core assembly.

FIG. 9 is a perspective view illustrating an exemplary core assembly. As illustrated in FIG. 9, core assembly 20 of the present embodiment is formed such that parallel side portions of flat core 24 formed in a U-shape are inserted to flat coils 22-1 and 22-2.

Coil 22 (22-1, 22-2) is energized when actuator main body A is driven, and thus functions as a solenoid that generates magnetic field. Together with core 24 and suction part 45 of movable body 40, coil 22 makes up a magnetic circuit (magnetic path) that suctions and moves movable body 40. It is to be noted that power is supplied to coil 22 from the external power source through substrate 23 (which corresponds to actuator driver 230). For example, actuator main body A is driven by supplying power to coil 22 by supplying a driving current to actuator main body A from microcomputer 220 (see FIG. 31) through actuator driver 230.

In core 24, both end parts of the U-shape are magnetic poles 201a and 201b that are excited through energization of coil 22 and make up a magnetic suction force generation part. Magnetic poles 201a and 201b are linearly disposed side by side in the Y direction at a middle position between base bottom end parts 30b of base top end part 30a and spring connecting part 36.

In addition, magnetic poles 201a and 201b are disposed opposite to suction part 45 of movable body 40 with gap G therebetween in the X direction. Preferably, each of magnetic poles 201a and 201b has a planar shape. That is, the winding shaft of coil 22 is disposed in the front-rear direction, that is, the vibration direction, and fixed such that magnetic poles 201a and 201b face from the bottom end part 30b side to the top end part (also referred to as "base top end part") 30a side of base part 32.

Core 24 is a magnetic material made of a soft magnetic material or the like, and is formed of silicon steel plate, permalloy, ferrite, or the like, for example. In addition, core 24 may be composed of electromagnetic stainless steel, sintered material, metal injection molded (MIM) material, laminated steel sheet, electrogalvanized steel sheet (SECC), or the like.

Magnetic poles 201a and 201b are excited through energization of coil 22, and suctions and moves suction part 45 of movable body 40 separated in the vibration direction (the X direction). To be more specific, magnetic poles 201a and 201b function as a suction force generation part with the generated magnetic flux, and suction suction part 45 of movable body 40 disposed opposite to it through gap G. It is to be noted that gap G is a spacing between the suction force generation part and suction part 45 in the X direction, and determines the movable region of movable body 40.

The configuration of core 24 is not limited as long as it is magnetized through energization of coil 22 and makes up a magnetic circuit that moves suction part 45 in the X direction, with suction part 45 and magnetic poles 201a and 201b serving as a suction force generation part.

Movable Body 40

Movable body 40 is disposed to overlap base part 32 in the thickness direction of actuator main body A so as to be movable in the vibration direction, which is the direction orthogonal to the thickness direction, e.g., the X direction. Movable body 40 includes plate-shaped movable body main body 42, and suction part 45 provided in movable body main body 42 and disposed opposite to magnetic poles 201a and 201b.

Through elastic support part 50 (51, 52) separated in the vibration direction, movable body 40 is disposed in a suspended state such that movable body 40 is movable in the vibration direction (the X direction) with respect to base part 32.

Movable body main body 42 is a plate-shaped body composed of magnetic materials such as electromagnetic stainless steel, sintered material, metal injection mold (MIM) material, laminated steel sheet, and electrogalvanized steel sheet (SECC), or the like, and for example, it is formed by processing a SECC sheet.

Movable body main body 42 includes opening 44 formed corresponding to core assembly 20 of base part 32. Coils 22-1 and 22-2 are disposed inside opening 44, and thus the entire thickness of vibration actuator is reduced. That is, with the configuration in which movable body main body 42 includes opening 44, the thickness of actuator main body A, and in turn, the entire vibration actuator 10, can be reduced in comparison with the configuration provided with no opening 44. In addition, since oil 22 of core assembly 20 is placed in opening 44, movable body main body 42 is not disposed in the vicinity of coil 22, and reduction in conversion efficiency due to the leakage magnetic flux leaked from coil 22 can be suppressed, thus achieving high output.

Movable body main body 42 is fixed to strain member 80 for the purpose of attaching to an operation device such as touch panel, for example.

Movable body main body 42 is formed in a rectangular frame plate shape that surrounds opening 44. Movable body main body 42 is fixed to a part of strain member 80. In the present embodiment, movable body main body 42 is fixed to a part of strain member 80 by fitting (in the present embodiment, thread-engaging) stopper receipt part 92 of movement restriction part 90 and stopper pin 94 (see FIG. 10).

Figure 6:
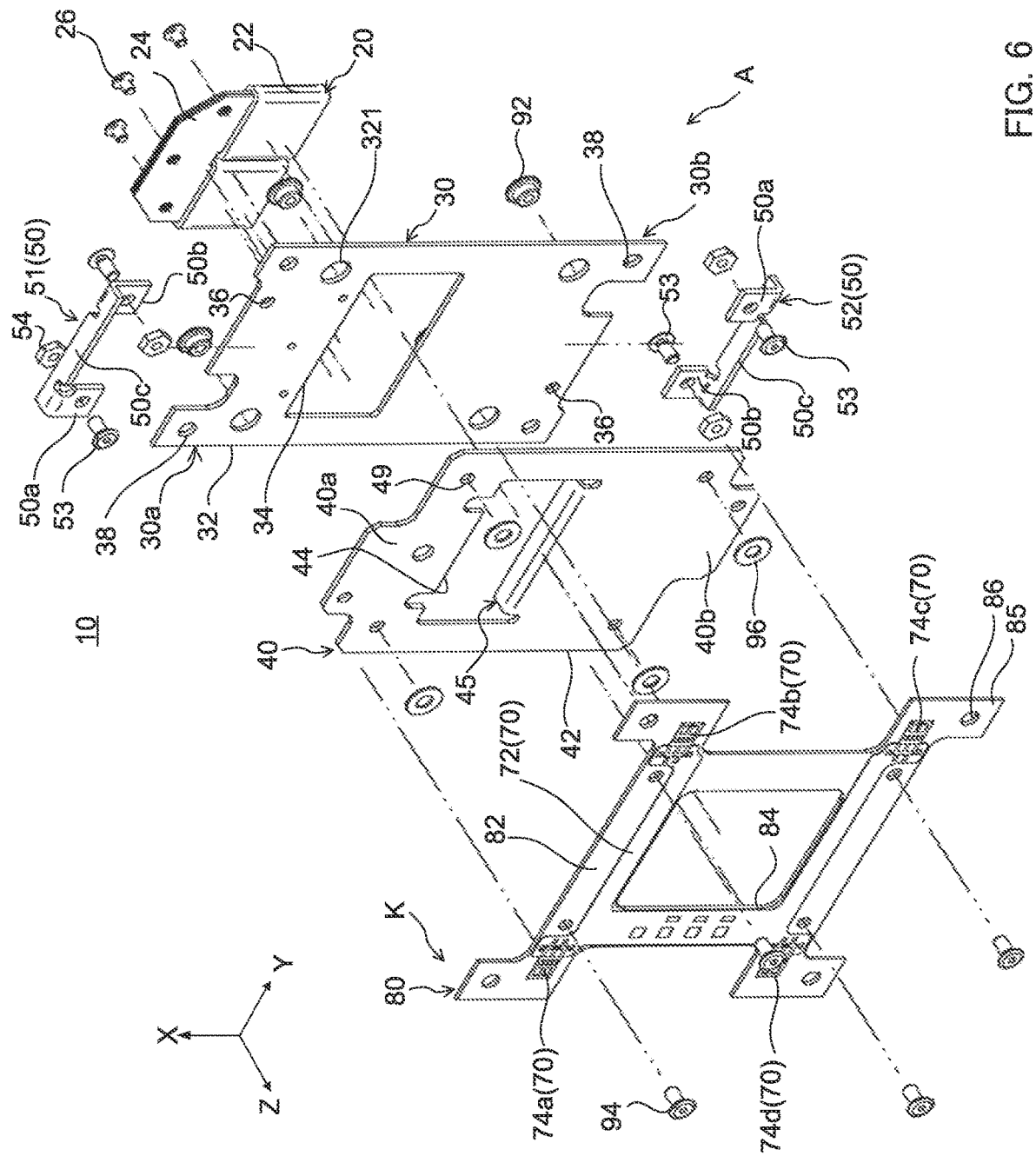
FIG. 6 is an exploded perspective view of the vibration actuator according to Embodiment 1 of the present invention.
Figure 10:
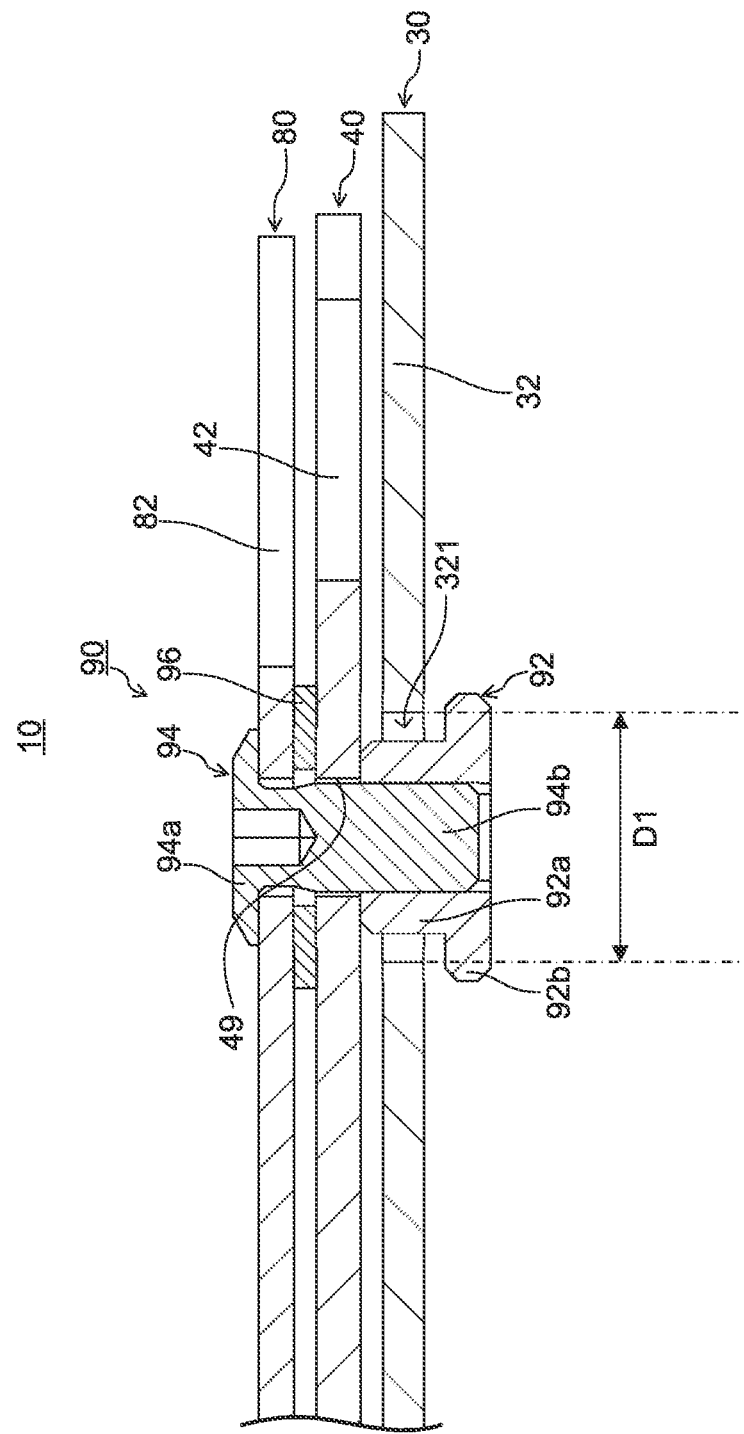
FIG. 10 is a sectional view taken along line A-A of FIG. 4.

To be more specific, as illustrated in FIG. 6 and FIG. 10, between fixing body 30 and movable body 40, movement restriction part 90 restricts the relative movement range of movable body main body 42 in the thickness direction (the Z direction), width direction (the Y direction), or front-rear direction (the X direction) with respect to base part 32 of fixing body 30. Here, the restriction in the front-rear direction movement is defined by the gap between internal diameter D1 of through hole 321 of base part 32 and the outer diameter of the movable body side portion (here, stopper receipt part 92) disposed in through hole 321.

Stopper receipt part 92 includes cylindrical insertion part 92a for insertion to the through hole of base part 32, and flange part 92b provided at one end side of insertion part 92a. To be more specific, stopper receipt part 92 is a screw receipt part, and a female screw part is provided at the inner peripheral surface of insertion part 92a.

In stopper receipt part 92, insertion part 92a is inserted from the bottom surface side of base part 32. At this time, flange part 92b engages with the bottom surface of base part 32, and prevents stopper receipt part 92 from being removed to the top surface side of base part 32.

Stopper pin 94 inserted from strain member 80 side is inserted and fixed to stopper receipt part 92. Stopper receipt part 92 and stopper pin 94 make up a retainer part.

Stopper pin 94 includes flange part 94a that engages at the top surface of strain member 80, and pin shaft 94b continuous from flange part 94a. Pin shaft 94b of stopper pin 94 is inserted to the through hole of strain member 80 from the top surface side of strain member 80, and extends through movable body main body 42 through washer 96. In the present embodiment, stopper pin 94 is a screw threadedly engaged with stopper receipt part 92 serving as a screw receptacle, and a male screw part that is threadedly engaged with the female screw part of insertion part 92a is provided at the outer periphery of pin shaft 94b.

By fitting, i.e., thread-engaging pin shaft 94b to insertion part 92a of stopper receipt part 92, strain member 80 and movable body main body 42 through which pin shaft 94b extends are sandwiched by the end of insertion part 92a and flange part 94a of stopper pin 94 with washer 96 therebetween. In this manner, strain member 80 and movable body main body 42 are restricted by movement restriction part 90 such that they integrally and relatively move within a predetermined range in the X direction and the Z direction, with respect to base part 32.

Movable body main body 42 is integrally fixed to frame part 82 of strain member 80 through movement restriction part 90. In addition, movable body main body 42 is joined to elastic support part 50 (51, 52) at top end part 40a and bottom end part 40b.

Suction part 45 is suctioned by magnetic poles 201a and 201b magnetized at core assembly 20, and is disposed opposite to magnetic poles 201a and 201b in the vibration direction. In the present embodiment, suction part 45 is formed such that a part of movable body main body 42 is bent and drooped. Suction part 45 is a planar member composed of a magnetic substance, and makes up a magnetic circuit together with core assembly 20.

Elastic Support Part 50 (51, 52)

Elastic support part 50 (51, 52) supports movable body 40 such that movable body 40 is movable with respect to fixing body 30. Elastic support part 50 (51, 52) supports movable body 40 suspended over base part 32 of fixing body 30 such that movable body 40 is movable in the X direction, which is a direction orthogonal to the direction in which base part 32 and movable body main body 42 overlap (the direction orthogonal to the thickness direction). It is to be noted that elastic support parts 51 and 52 are members with point symmetrical shapes about the center of movable body 40, and in the present embodiment, they have a similar form. FIG. 8 illustrates elastic support part 51.

Elastic support part 50 is disposed such that in movable body main body 42 with respect to base part 32, suction part 45 is opposite to magnetic poles 201a and 201b of core 24 of fixing body 30 with gap G therebetween.

Elastic support part 50 is a leaf spring (spring plate member). It includes second end part 50a fixed to movable body main body 42, first end part 50b fixed to base part 32, and elastic deformation part 50c that couples first end part 50b and second end part 50a. First end part 50b and second end part 50a are separated in the Y direction, and elastic deformation part 50c extends in the Y direction, i.e., the direction orthogonal to both the vibration direction and the thickness direction, with the thickness direction as the X direction. The thickness direction of elastic deformation part 50c coincides with the vibration direction, and elastic deformation part 50c ensures a deflection length the length in the Y direction.

In this manner, elastic support part 50 appropriately sets the length of elastic deformation part 50c along width direction (the Y direction), and can couple base part 32 and movable body main body 42 at first end part 50b and second end part 50a at both ends.

In addition, elastic deformation part 50c is fixed on end part of 40a side and bottom end part 40b side of movable body 40 with the sheet thickness direction aligned with the X direction and the extending direction aligned with the Y direction. It suffices that elastic support part 50 ensures an installation space in the extending direction of elastic deformation part 50c that actually deforms, by the length of the width direction (the Y direction). In this manner, cost reduction and assemblability can be improved by reducing the size of elastic support part 50 itself, and even a case where the spring constant is reduced in vibration actuator 10 can be easily handled.

It is to be noted that basically, elastic deformation part 50c deforms in such a manner as to vibrate movable body 40 in the vibration direction as the X direction orthogonal to the Z direction as the thickness direction, with respect to fixing body 30. In vibration actuator 10, elastic deformation part 50c couples first end part 50b fixed to base part 32 and second end part 50a fixed to movable body main body 42, and is separated in the Y direction. In this manner, the resonance point of the vibration in the Z direction can be easily disposed in the vicinity of the resonance point of the vibration in the X direction of elastic deformation part 50c. Thus, elastic deformation part 50c can deform such that movable body 40 vibrates along the extending direction of base part 32 in both the X direction and the Z direction as the vibration direction, with respect to fixing body 30.

Figure 11:
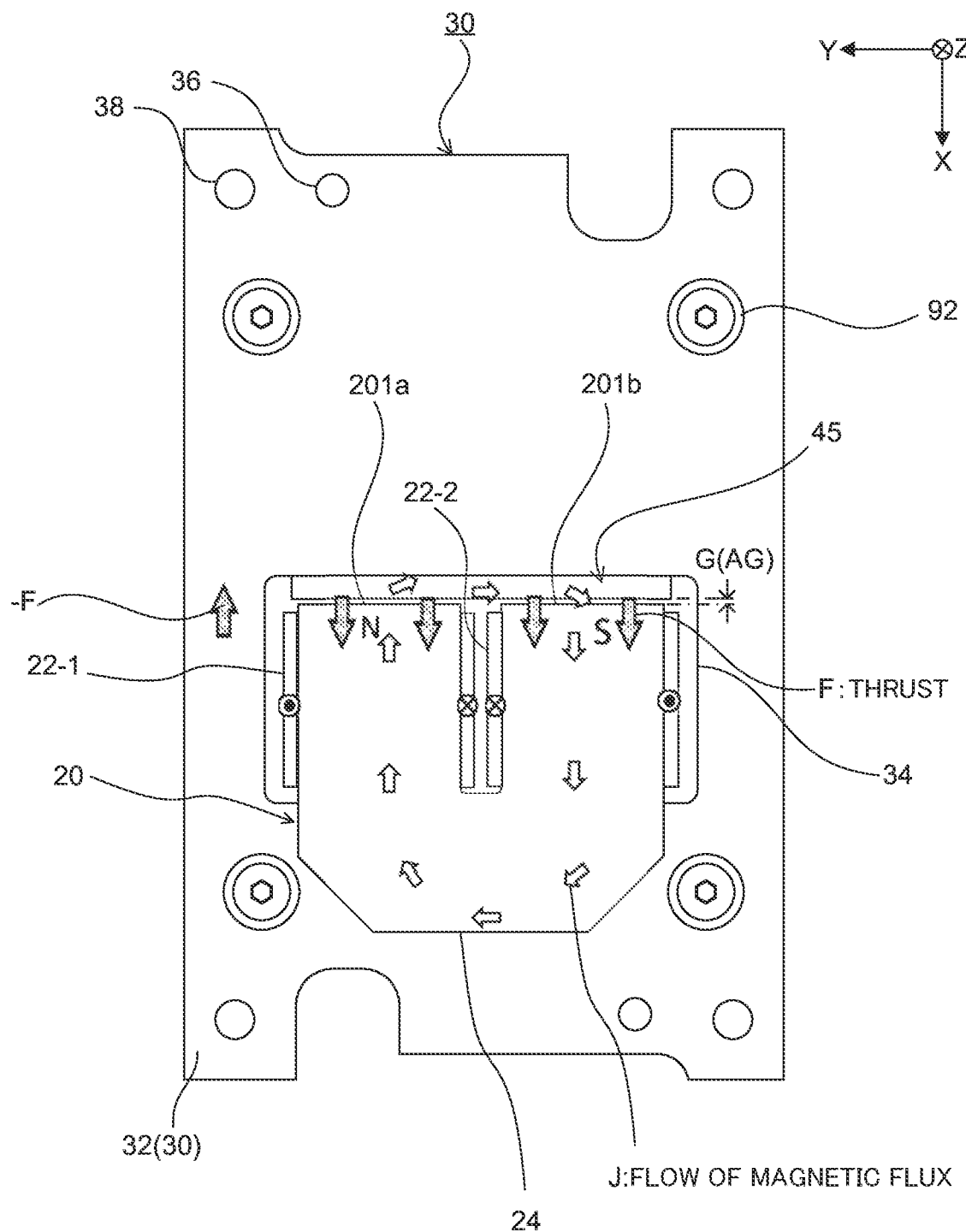
FIG. 11 is a diagram illustrating a magnetic circuit configuration of the vibration actuator according to Embodiment 1 of the present invention.

FIG. 11 is a diagram illustrating a magnetic circuit configuration of vibration actuator 10 according to Embodiment 1 of the present invention. The magnetic circuit has a similar magnetic flux flow J also in the portion not illustrated in the drawing.

To be more specific, when coil 22 is energized, core 24 is excited and a magnetic field is generated, such that the both end parts of core 24 serve as magnetic poles 201a and 201b, i.e., the magnetic suction force generation part. For example, in FIG. 11, in core 24, magnetic pole 201a is the N pole, and the magnetic pole 201b is the S pole. Thus, a magnetic circuit illustrated as magnetic flux flow J is formed between core assembly 20 and movable body main body 42. Magnetic flux flow J in the magnetic circuit flows from magnetic pole 201a to suction part 45 of movable body main body 42 opposite to magnetic pole 201a, flows to magnetic pole 201b from the portion opposite to magnetic pole 201b at suction part 45 through suction part 45 of movable body main body 42, and reaches flow through core 24.

In this manner, by the principle of electromagnetic solenoid, magnetic poles 201a and 201b of core assembly 20 generates suction force (thrust) F that suctions suction part 45 of movable body main body 42, and suction part 45 of movable body main body 42 is attracted by both magnetic poles 201a and 201b of core assembly 20. Movable body 40 including movable body main body 42 moves to the direction of suction force F against the biasing force of elastic support part 50.

In addition, when the energization of coil 22 is released, the magnetic field is eliminated, suction force F of movable body 40 by core assembly 20 is eliminated, and a movement in the direction to the original position (a movement in −F direction) is performed with the biasing force of elastic support part 50.

By repeating this operation, in actuator main body A, movable body 40 moves back and forth and thus a vibration in the vibration direction (the X direction) can be generated.

It is to be noted that preferably, the range of the amount of displacement of movable body 40 is, for example, a range in which a vibration corresponding to an indication pressed by the operator on the screen of a touch panel serving as an operation device can be provided. For example, in the case where the indication to be pressed by the operator in the screen of the touch panel is a mechanical button or various types of switches, the range of amplitude that can provide the same touch feeling as the actual pressing of the mechanical button or various types of switches. The range is set in consideration of the fact that the touch feeling is insufficient if the displacement of the amplitude of movable body 40 is small, and the touch feeling is uncomfortable if the displacement of is large, and the range may be set a range of the displacement amount may be 0.03 mm to 0.3 mm, or the like.

In actuator main body A, suction part 45 of movable body main body 42 is disposed in the vicinity in a face to face manner with respect to magnetic poles 201a and 201b of core assembly 20, and thus the magnetic circuit efficiency can be increased, thus achieving high output. In addition, actuator main body A can be driven without using magnets, and thus a low cost structure can be achieved.

In the plurality of elastic support parts 50 (51, 52), movable body 40 is supported by disposing belt□shaped elastic deformation part 50c with the thickness direction aligned with the vibration direction. Thus, it suffices to ensure the movable region in the vibration direction of elastic deformation part 50c, and a compact actuator is achieved.

Core assembly 20 including core 24 on which coil 22 is wound is fixed such that coil 22 is located in opening 34 of base part 32 of fixing body 30, and, with respect to movable body 40, it is disposed in opening 44 of movable body main body 42 disposed to overlap base part 32.

In this manner, it is not necessary to dispose the members provided to fixing body 30 and movable body 40 in an overlapping manner in the Z direction (for example, arrangement of the coil and the magnet in an opposite manner in the Z direction) for the purpose of driving the movable body in the X direction by generating the magnetism, and thus the thickness of actuator main body A serving as an electromagnetic actuator in the Z direction can be reduced. In addition, by moving movable body 40 back and forth without using magnets, a vibration as touch feeling can be provided to the operation device. The simple support structure simplifies the design, saves space, and allows the actuator main body A to be made thinner.

In the following, the drive principle of actuator main body A is briefly described. Actuator main body A, i.e., vibration actuator 10 may drive through generation of a resonance phenomenon using pulses with the equation of motion and circuit equation described below. It is to be noted that the operation is not resonance driving, but is an expression of the operation feeling of a mechanical switch displayed on the touch panel serving as an operation device, and it is driven by inputting multiple current pulses through actuator driver 230 (see FIG. 31) and the like.

It is to be noted that movable body 40 in actuator main body A performs a back-and-forth movement based on Equations (1) and (2).

[Equation 1]

$$m\frac{d^2x(t)}{dt^2} = K_f i(t) - K_{sp} x(t) - D\frac{dx(t)}{dt} \quad (1)$$

$m$: Mass [kg]

$(x)t$: Displacement [m]

$K_f$: Thrust constant $[N/A]$ $i(t)$: Current $[A]$ $K_{sp}$: Spring constant $[N/m]$ $D$: Attenuation coefficient $[N/(m/s)]$

[Equation 2]

$$e(t) = Ri(t) + L\frac{di(t)}{dt} + K_e \frac{dx(t)}{dt} \quad (2)$$

$e(t)$: Voltage [V]

$R$: Resistance [Ω]

$L$: Inductance [H]

$K_e$: Back electromotive force constant $[V/(rad/s)]$

Specifically, the mass m[Kg], displacement x (t) [m], thrust constant $K_f$[N/A], current i (t) [A], spring constant $K_{sp}$[N/m], attenuation coefficient D[N/(m/s)] and the like in actuator main body A may be appropriately changed within a range that meets Equation (1). In addition, voltage e(t) [V], resistance R [Ω], inductance L [H], and back electromotive force constant $K_e$ [V/(rad/s)] may be appropriately changed within a range that meets Equation (2).

As described above, it is determined by actuator main body A, mass m of movable body 40 and spring constant $K_{sp}$ of the metal spring (an elastic body, in the present embodiment, a leaf spring) serving as elastic support part 50.

Load Detection Module K

Load detection module K is described with reference to FIGS. 1 to 4 and 6. Load detection module K is interposed between movable body 40 of actuator main body A and a vibration presentation part (for example, a touch panel) that applies a vibration, and fixed to movable body 40 and the touch panel.

At strain detector 70, load detection module K detects a strain generated at strain member 80 as a result of the operation of pressing the touch panel. The detected strain is output to the control unit (for example, the microcomputer illustrated in FIG. 31), and the control unit generates a vibration by driving actuator main body A in accordance with the strain.

Strain Member 80

Strain member 80 includes frame part 82 fixed to movable body main body 42 of movable body 40, opening 84, and presentation part connecting part 86 fixed to the vibration presenting part such as a touch panel.

Strain member 80 functions as a straining member that generates a strain when an external force is applied by a pressing operation on the vibration presenting part. In the present embodiment, strain member 80 is formed by processing a sheet metal into a rectangular plate-frame shape. This shape is a shape that is disposed to surround the portion to be pressed and operated in the vibration presenting part on the rear surface side of the vibration presenting part when fixed to the vibration presenting part with a planar shape.

In strain member 80, connection arm part 85 extending in the longitudinal direction is provided at the four corners of frame part 82 with a rectangular flat plate frame shape. In strain member 80, strain detection sensors 74a to 74d are disposed at the portions of connected frame part 82 where the bottom end part of connection arm part 85 are connected.

Presentation part connecting part 86 is provided at connection arm part 85, and strain member 80 is fixed to the vibration presentation part through presentation part connecting part 86. In this manner, strain member 80 is fixed to the vibration presentation part through presentation part connecting part 86 of connection arm part 85, and frame part 82 is fixed to movable body main body 42 of movable body 40, and thus, the function as the straining member is performed mainly at connection arm part 85.

Strain Detector 70

Strain detector 70 is provided integrally to strain member 80, and includes a strain detection part that detects a strain that is generated by a load exerted on strain member 80 serving as the straining member for driving actuator main body A.

Strain detector 70 is, for example, substrate 72 on which a plurality of strain detection sensors 74a to 74d serving as strain detection parts are mounted and a circuit that electrically connects the plurality of strain detection sensors 74a to 74d is mounted. It is to be noted that substrate 72 may be composed of a flexible printed board (hereinafter referred to as FPC) or the like.

When the vibration presenting part is operated, strain detection sensor (load sensor) 74 detects the pushing amount of strain member 80 that is displaced together with movable body 40 as the pushing amount of the vibration presenting part.

Together with movable body main body 42, strain detection sensors 74a to 74d detect the strain of strain member 80 due to the deformation of elastic support part 50 when pushed to base part 32 side. The detected strain is output to the control unit and the like, and coil 22 is energized and movable body main body 42 is suctioned and moved such that the movement amount of movable body 40 corresponding to that strain is achieved.

Figure 31:
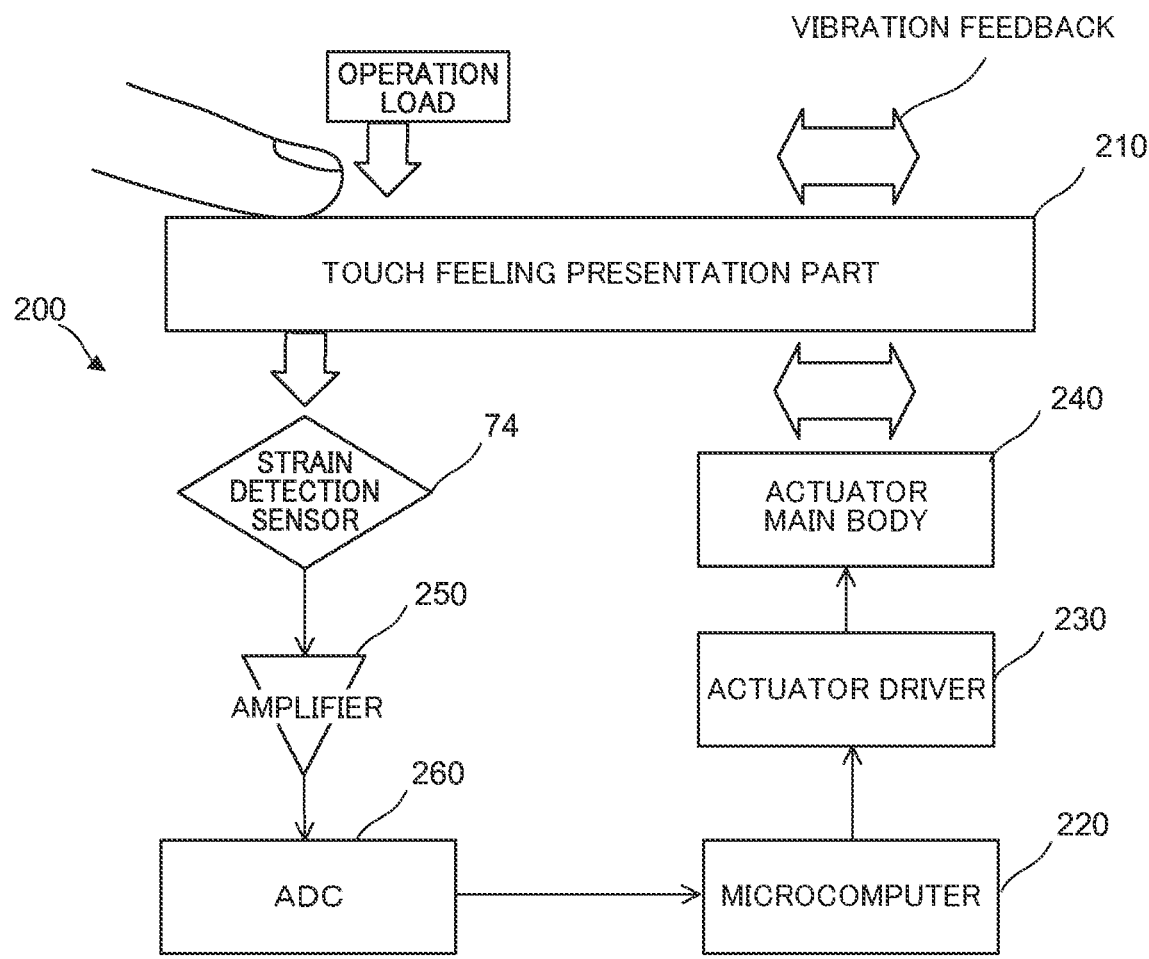
FIG. 31 is a diagram schematically illustrating a vibration presentation device including a vibration actuator.

For example, in the vibration presentation device illustrated in FIG. 31, a configuration is conceivable in which the control unit such as a microcomputer determines the movement amount of vibration presenting part by using a strain detected by strain detection sensor 74 to achieve a vibration feedback for a contact. It is to be noted that the control unit may use a sensor that detects a contact of the operator on the operation device to detect the pushing amount to elastic support part 50 at the movement amount corresponding to the actual movement amount of the operation device so as to achieve more natural touch using the detection result.

In addition, it is possible to adjust the vibration cycle of movable body 40 (which may include the vibration presenting part serving as an operation device) when a driving current pulse is supplied by the current pulse supply part of the control unit on the basis of the detection result of the touching operation of the operator using strain detection sensors 74a to 74d, i.e., the detection result of the sensor that detects the pushing amount of movable body 40. In addition, in addition to strain detection sensor 74, the control unit may operate in accordance with an operation signal representing the operation state that is output to the control unit so as to generate a vibration corresponding to the display mode at the touch position of the operator detected at the vibration presenting part.

With connection arm part 85 mainly as the straining member in strain member 80, strain detector 70 detects its strain and outputs the detected strain to the control unit.

To be more specific, strain detector 70 includes substrate 72 formed in a staple shape (U-shape) disposed over the four corners of frame part 82 on frame part 82 of strain member 80. That is, substrate 72 is disposed such that the short part perpendicular to the longitudinal part protrudes in the width direction (the Y direction) from both sides of the longitudinal part extending in the longitudinal direction as the vibration direction (the X direction), and substrate 72 is formed in a U-shape with the longitudinal part and the short part.

In strain detector 70, strain detection sensors 74a to 74d are mounted between frame part 82 where movable body main body 42 is fixed and presentation part connecting part 86 fixed to the vibration presentation part, i.e., on connection arm part 85 that functions as the straining member. In this manner, strain detector 70 detects a strain at connection arm part 85 of strain member 80.

Strain detector 70 is provided at strain member 80 fixed to movable body 40, and therefore detection sensors 74a to 74d are in a state as a state where it is disposed at movable body 40. Thus, it is possible to achieve a detection in the close vicinity of the vibration presenting part on which a load is exerted during operation, and achieve stable detection, thus achieving a speedy performance of a real touch feeling like a touch of a switch.

In load detection module K, strain detection sensors 74a to 74d may be provided in one place, but it is possible to provide strain detection sensors 74a to 74d at multiple places. In the case where vibration actuator 10 is attached to the vibration presentation part, they are radially provided at even intervals at least at three locations in a surrounding manner at the center of the operation surface of vibration presentation part. In this manner, the displacement of the vibration presenting part that is pressed and operated can be received on a surface and accurately detected at vibration actuator 10.

In the present embodiment, strain detection sensors 74a to 74d are provided at four locations in the vicinity of presentation part connecting part 86 where the vibration presentation part is fixed, and detect strains at corner portions with a frame shape surrounding the center of the pressing operation region of the vibration presentation part. Thus, in the case where a rectangular touch panel display is used as a vibration presentation part as in the vibration presenting part, actuator main body A can be attached with a good balance to the display through load detection module K. In this manner, the strain direction of strain member 80 can be stably matched to the plane direction.

Figure 30:
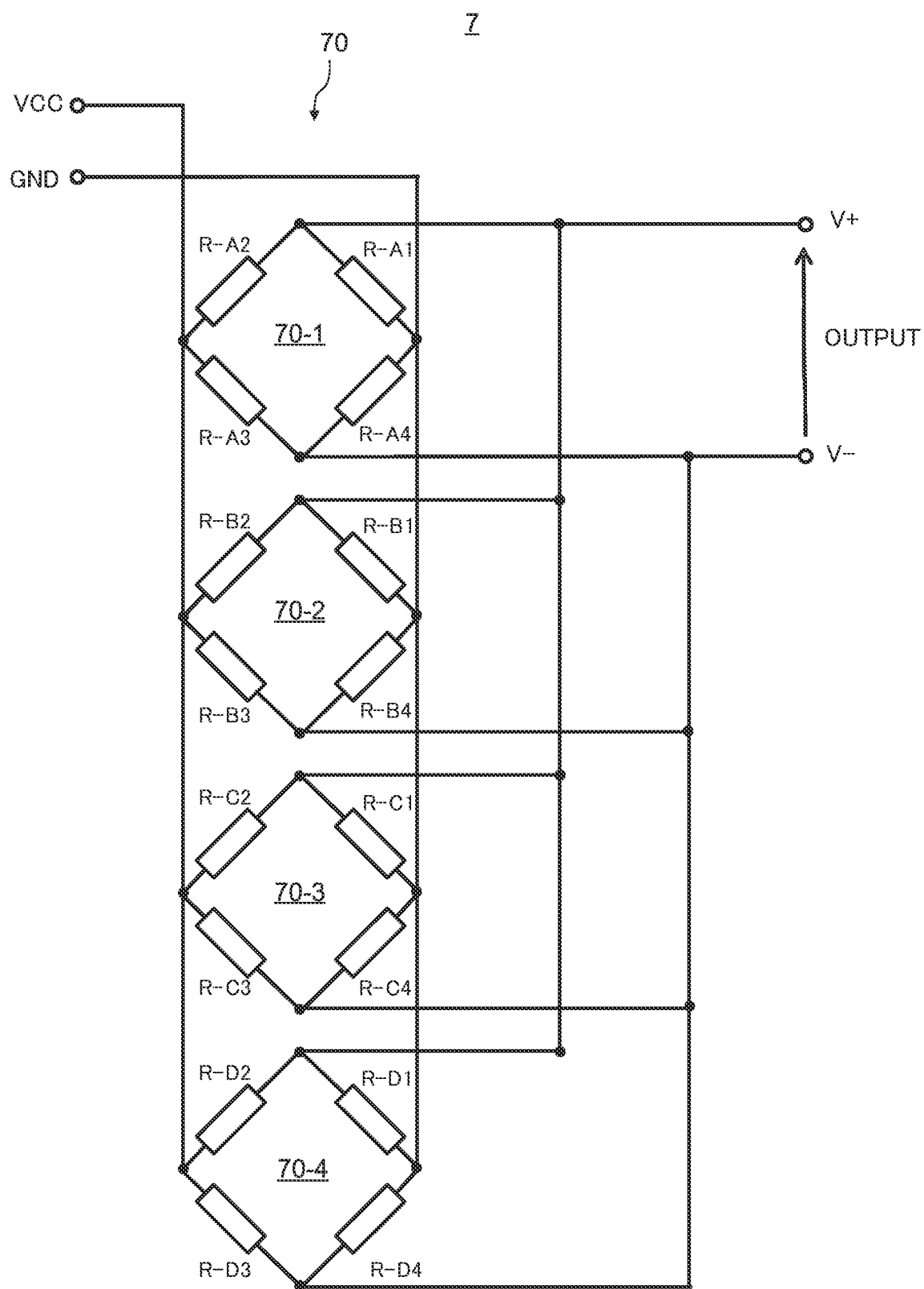
FIG. 30 is a diagram illustrating a wiring of a strain detector.

FIG. 30 is a diagram illustrating a wiring of strain detector 70. Strain detection sensors 74a to 74d mounted on substrate 72 are disposed on strain member 80 and located on the same plane.

Strain detection sensors 74a to 74d are strain detection sensors with full bridge connections and each of strain detection sensors 74a to 74d includes a plurality of strain gauge parts (R-A1 to R-A4, R-B1 to R-B4, R-C1 to R-C4, and R-D1 to R-D4).

Strain detection sensors 74a to 74d are connected in parallel to each other on the board 72, each connected in parallel to the power supply voltage Vcc and GND, and are connected to output the amount of change in electrical resistance value that changes as a load is applied. As a result, the output from each of strain detection sensors 74a to 74d is averaged, resulting in stable behavior. In addition, the output values are generally uniform in temperature for each of strain detection sensors 74a to 74d, which improves the temperature stability.

In addition, in actuator main body A, screw 53 as a securing member is used for the fixation of base part 32 and elastic support part 50 and fixation of elastic support part 50 and movable body 40. In the present embodiment, screw 53 and nut 54 are used for the fixation. In this manner, elastic support part 50, which is required to be firmly fixed to fixing body 30 and movable body 40 for driving movable body 40, can be mechanically firmly fixed while allowing for reattachment.

In vibration actuator 10, a stopper serving as movement restriction part 90 for preventing protrusion to strain member 80 side is disposed between movable body main body 42, and in turn, strain member 80, and base part 32. This restricts the movement range of movable body main body 42 with respect to base part 32 in the thickness direction (the Z direction), width direction (the Y direction), or front-rear direction (the X direction).

Figure 12:
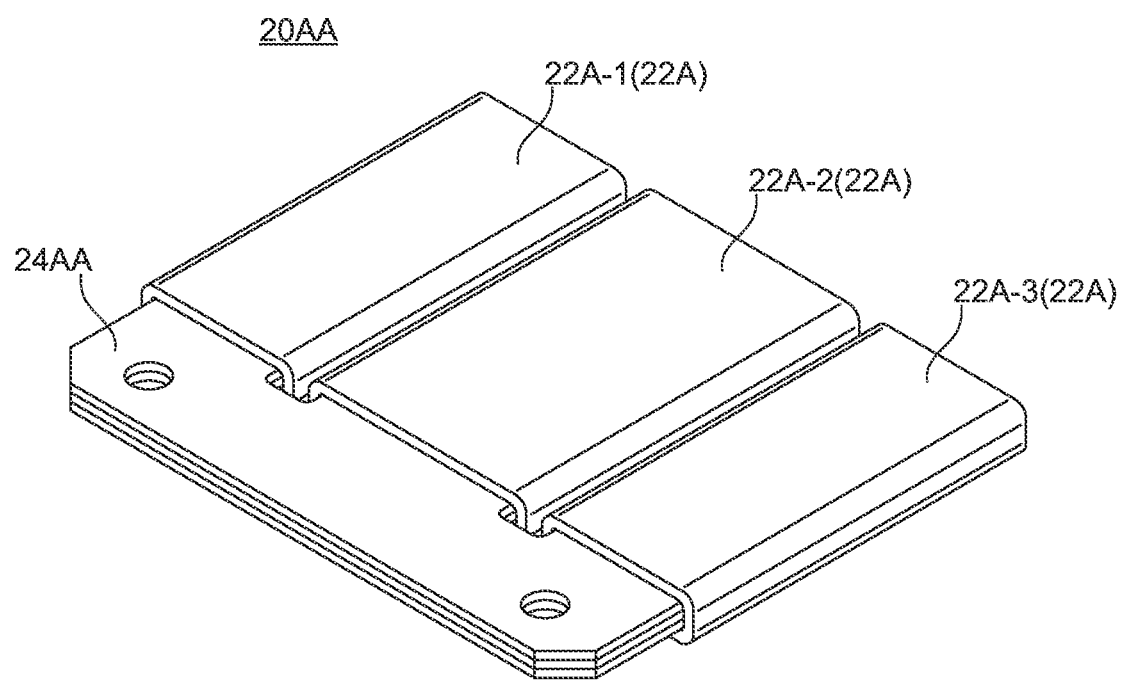
FIG. 12 is a perspective view illustrating a modification of the core assembly.

It is to be noted that while core assembly 20 has a U-shape in the present embodiment, this is not limitative, and, for example, core assembly 20AA including E-shaped core 24AA may be used as illustrated in FIG. 12. FIG. 12 is a perspective view illustrating core assembly 20AA as a modification of the core assembly, and FIG. 13 is a diagram illustrating a magnetic circuit configuration of a vibration actuator in which core assembly 20AA is applied.

Figure 13:
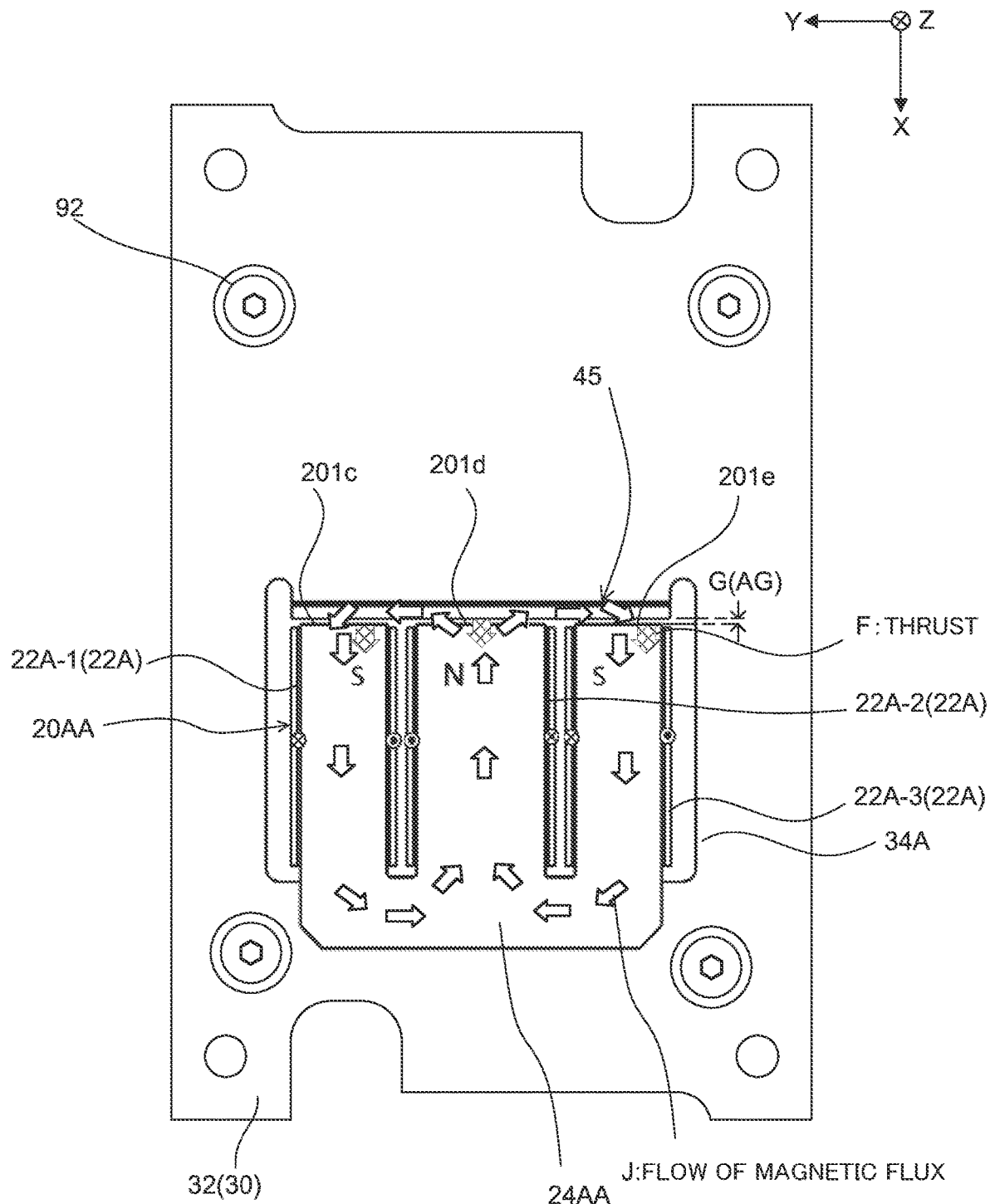
FIG. 13 is a diagram illustrating a magnetic circuit configuration of a vibration actuator to which a modification of the core assembly is applied.

Core assembly 20AA illustrated in FIG. 12 and FIG. 13 has a configuration in which coil 22A (22A-1, 22A-2 and 22A-3) is wound on three parallel side portions in E-shaped core 24AA. In this manner, the magnetic suction force can be increased, and a high-output vibration actuator can be achieved in a cost-effective manner without using other core assemblies. It is to be noted that core assembly 20AA may be applied as the core assembly in vibration actuators of Embodiments 2 to 5.

Effect

According to vibration actuator 10 of the present embodiment, suction part 45 suctioned by the magnetic suction force generation part is disposed at a center portion of elastic support parts 51 and 52 on the front-rear sides in the vibration direction. Thus, suctioning at or near the center of a holding mechanism of an elastic material can be achieved, and the force exerted on the vibration presentation part to which the vibration is to be transmitted is exerted with a good balance, thus achieving a stable vibration. Thus, it is possible to achieve a favorable magnetic circuit efficiency and high output. Further, it is possible to achieve cost reduction and thickness reduction since no magnet is used, and it is possible to efficiently output a vibration suitable for the touch feeling feedback to the operator making a contact operation. Thus, it can be favorably stably applied to a touch feeling feedback structure of a touch panel that requires devices of cost reduction, thickness reduction and high output.

In addition, in vibration actuator 10, a space can be formed in a region on the bottom end part side than suction part 45 in the thickness direction of vibration actuator 10 as illustrated in FIG. 5. In this manner, further thickness reduction can be achieved. Furthermore, the degree of freedom in the placement in the device in which vibration actuator 10 is incorporated and the degree of freedom in the installation space of other components in that device can be improved.

In addition, in vibration actuator 10, suction part 45 is formed such that a part of movable body main body 42 is bent and drooped. In this manner, complicated components are not required to make up the magnetic circuit configured together with the suction force generation part, and thus cost reduction can be achieved. In addition, since movable body main body 42 and suction part 45 are configured with a sheet metal, the magnetism saturation can be suppressed by the sheet thickness of the sheet metal, and a high-output vibration can be achieved.

In addition, according to the present embodiment, the movement of movable body main body 42 with respect to base part 32 in their separation direction (the thickness direction i.e., the Z direction) is restricted through movement restriction part 90, and thus the damage of elastic support parts 51 and 52 can be prevented.

To be more specific, the retainer part is composed of stopper receipt part 92 and stopper pin 94, and removal of movable body main body 42 from base part 32 is prevented. In this manner, it is easy to adjust the clearance therebetween, and it is possible to achieve space-saving movement restriction part 90 and movement restriction in the surface direction.

Embodiment 2

Figure 14:
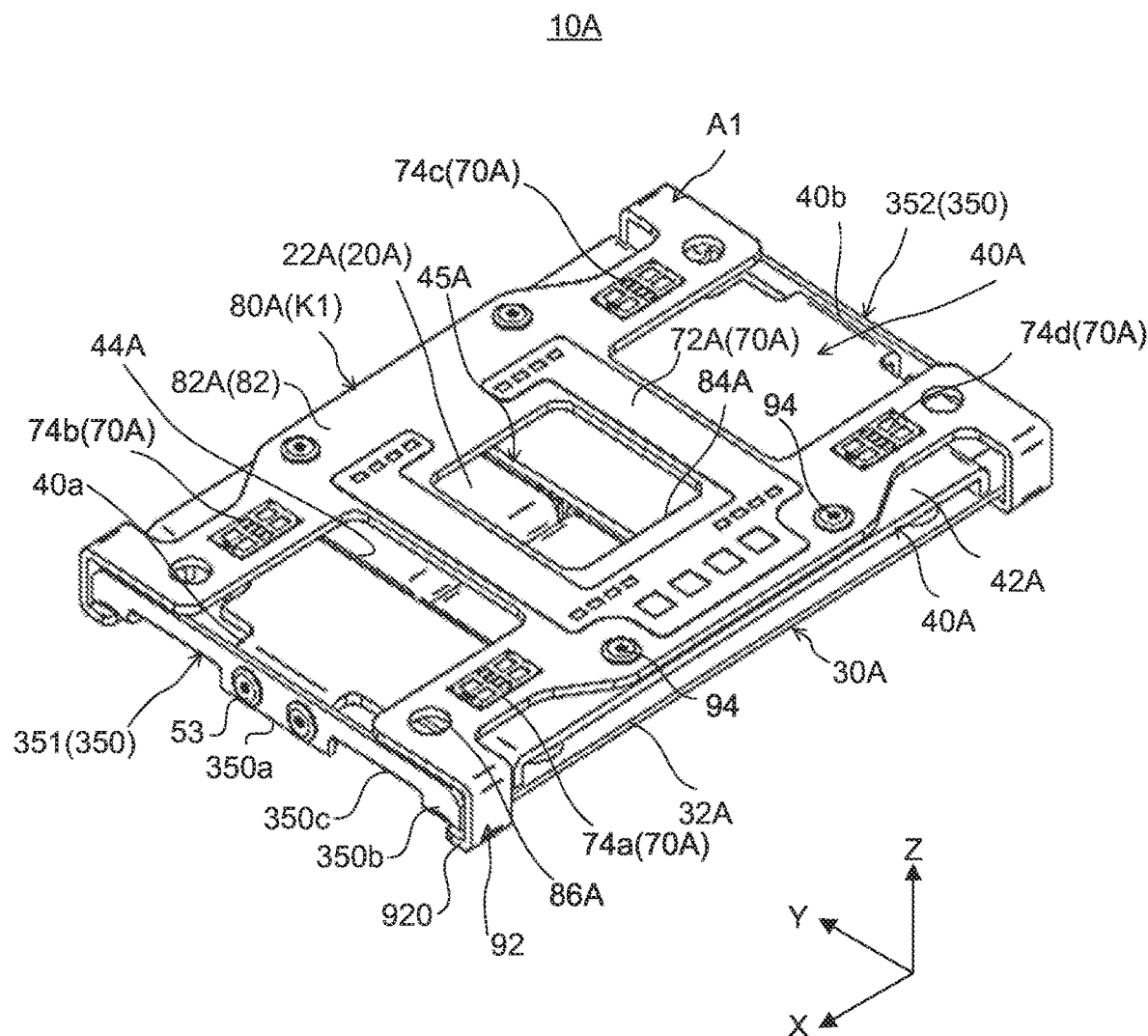
FIG. 14 is a perspective view of an external appearance of a vibration actuator according to Embodiment 2 of the present invention.
Figure 15:
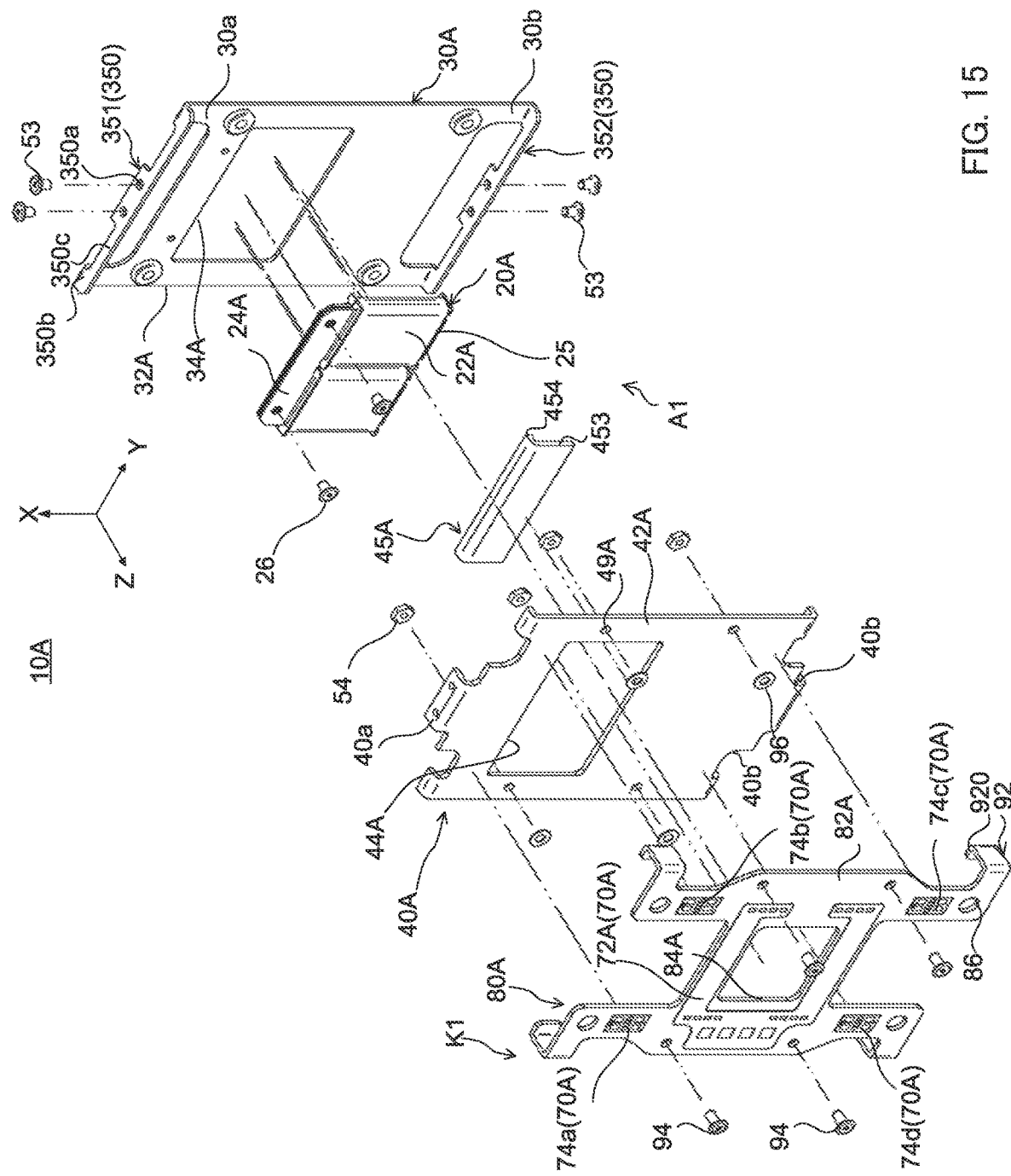
FIG. 15 is an exploded perspective view of the vibration actuator according to Embodiment 2 of the present invention.
Figure 16:
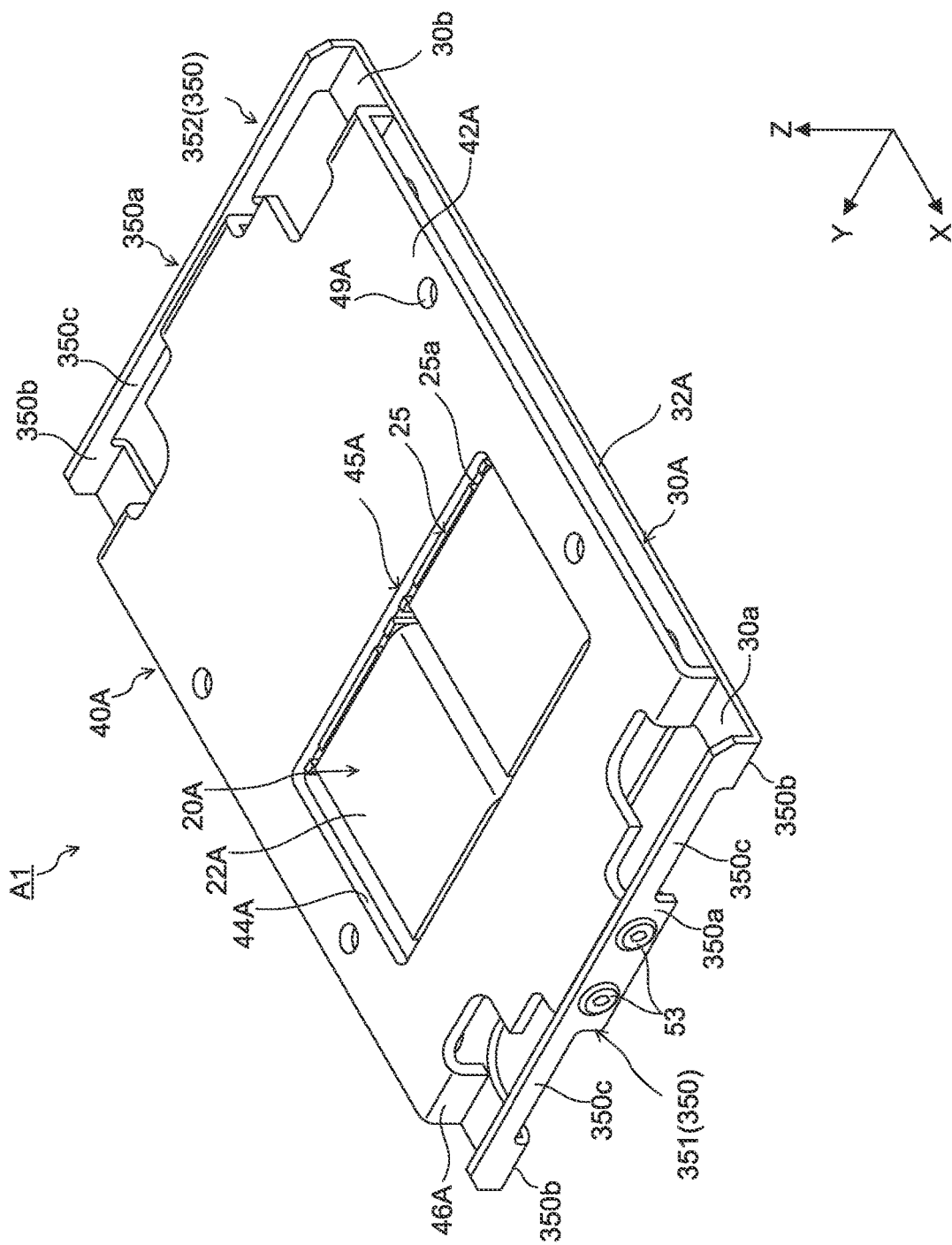
FIG. 16 is a perspective view of an actuator main body illustrating a configuration of a main part of the vibration actuator according to Embodiment 2 of the present invention.
Figure 17:
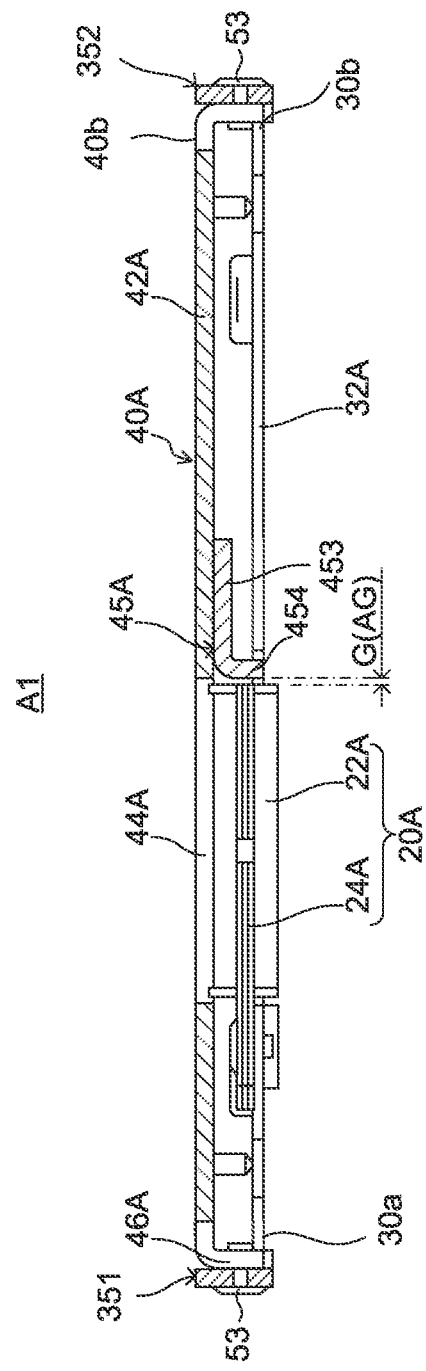
FIG. 17 is a sectional view of a core assembly of an actuator main body illustrating a configuration of a main part of the vibration actuator according to Embodiment 2 of the present invention.

FIG. 14 is a perspective view of an external appearance of a vibration actuator according to Embodiment 2 of the present invention, and FIG. 15 is an exploded perspective view of the vibration actuator according to Embodiment 2 of the present invention. In addition, FIG. 16 is a perspective view of an actuator main body illustrating a configuration of a main part of the vibration actuator according to Embodiment 2 of the present invention. FIG. 17 is a sectional view of a core assembly of an actuator main body illustrating a configuration of a main part of the vibration actuator according to Embodiment 2 of the present invention.

Vibration actuator 10A of Embodiment 2 is different from vibration actuator 10 only in the configuration of elastic support part 350 and the configuration of suction part 45A, and other functions are identical to each other. Therefore, the same configurations are denoted with the reference numerals of vibration actuator 10 with A attached thereto, the same drawing is used, and the description thereof is omitted.

Vibration actuator 10A differs in that the elastic support part is integrally provided on fixing body 30 side, or more specifically, base part 32A and elastic support part 350 are integrated while suction part 45A is separated from movable body main body 42A in the configuration of vibration actuator 10. That is, actuator main body A1 functions as a thin plate-shaped actuator with a basic configuration similar to that of actuator main body A.

Vibration actuator 10A includes actuator main body A1 and load detection module K1. As with load detection module K, load detection module K1 includes strain member 80A partially provided at movable body 40A, and strain detector 70A provided at strain member 80A. It is to be noted that the fixation of movable body 40A and strain member 80A in the present embodiment is achieved by screw 94 and nut 54. In strain member 80A, a strain is generated between movable body main body 42A and presentation part connecting part 86A and the strain is detected by strain detector 70A.

As illustrated in FIG. 14 to FIG. 17, vibration actuator 10A includes fixing body 30A including base part 32A and core assembly 20A, and movable body 40A including presentation part connecting part 86A connected to the vibration presentation part and suction part 45A composed of a magnetic material. As with core assembly 20, core assembly 20A is composed of coil 22A and core 24A on which coil 22A is wound (see FIG. 9), but here, coil 22A is wound on bobbin 25 and put on core 24A (core 24 similar to) with bobbin 25 therebetween.

Figure 18:
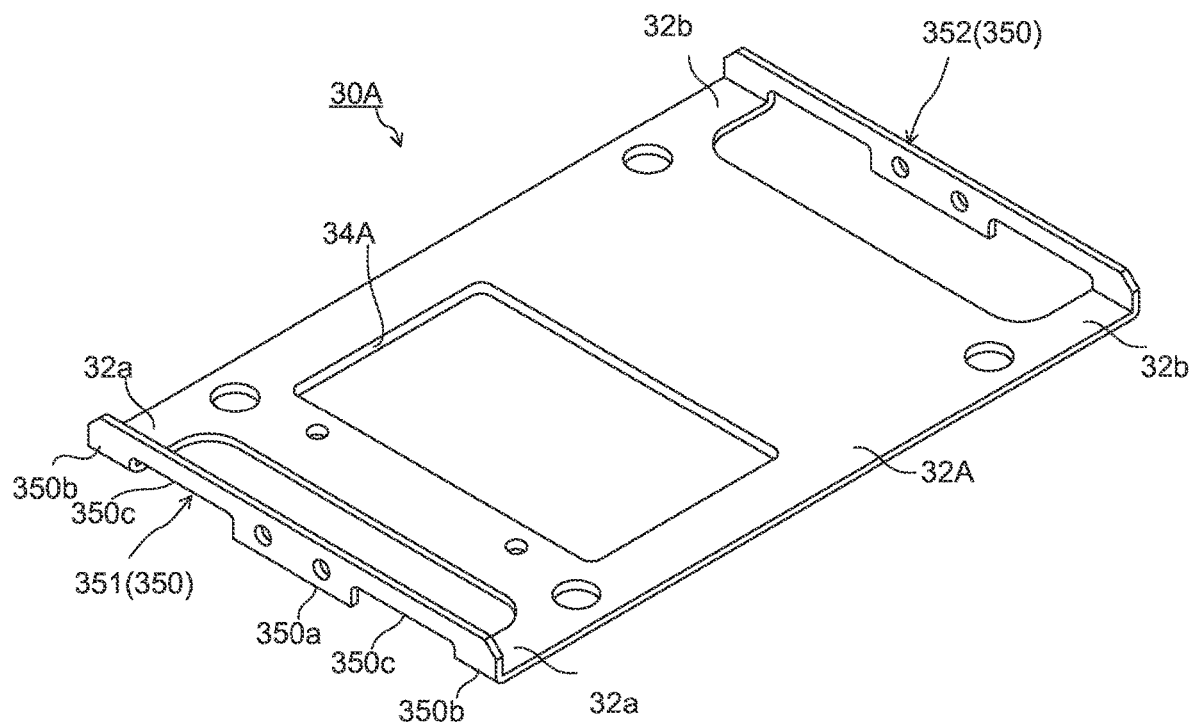
FIG. 18 is a perspective view of a base part of an actuator main body.

FIG. 18 is a perspective view of base part 32A of actuator main body A1. Fixing body 30A includes rectangular plate-shaped (card-shaped) base part 32A, and base part 32A is provided with opening 34A in which coil 22A is disposed when core assembly 20A is fixed.

Figure 19:
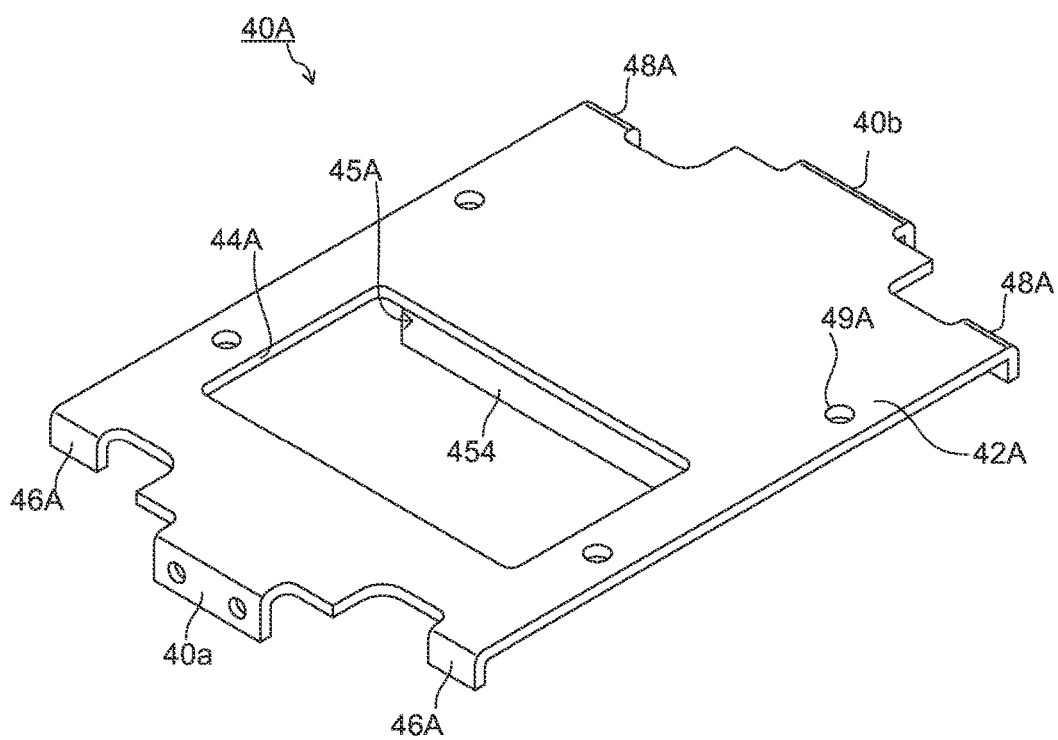
FIG. 19 is a perspective view of a movable body main body of an actuator main body.

FIG. 19 is a perspective view of a movable body main body of an actuator main body. As illustrated in FIG. 16 to FIG. 19, movable body 40A is supported to be movable in the vibration direction (the X direction) with respect to base part 32A through elastic support part 350 (351, 352) on base part 32A. As illustrated in FIG. 16 to FIG. 18, elastic support parts 351 and 352 are continuous from and integrally with top end part of 32a and bottom end part 32b of base part 32A, respectively. Since elastic support parts 351 and 352 are provided integrally with base part 32, it is possible to ensure the improved of assemblability, the improved of assembly accuracy, and cost reduction in the mounting, i.e., spring-mounting of the elastic support part.

Elastic support part 351 is provided across both end parts separated in the width direction (the Y direction) of end part 32a at top end part of 32a of rectangular shape base part 32A. Elastic support part 352 is provided across both end parts separated in the width direction (the Y direction) of bottom end part 32b at bottom end part 32b of rectangular shape base part 32A. Elastic support parts 351 and 352 are formed by bending up top end part 32a and bottom end part 32b separated in the longitudinal direction in a rectangular shape sheet metal serving as base part 32A.

At both end parts 350b and 350b of elastic support parts 351 and 352, elastic deformation parts 350c and 350c with movable body side connecting part 350a at the center are provided. Elastic support parts 351 and 352 deflect in the sheet thickness direction, i.e., the front-rear direction. Movable body side connecting part 350a is fixed to top end part 40a and bottom end part 40b of movable body main body 42A with securing member 53 such as a screw. In this manner, elastic support parts 351 and 352 are fixed to movable body 40A at the center portion (top end part 40a and bottom end part 40b) in the width direction (the Y direction) orthogonal to the vibration direction (the X direction) at the front-rear end parts of movable body 40A.

The fixing position on movable body 40A side in elastic support parts 351 and 352 is a center portion in the width direction (the Y direction) of movable body 40A. In this manner, the movement of movable body 40A in the vibration direction (the X direction the Y direction orthogonal to direction) is restricted at the center. In view of this, since it is easy to achieve highly linear driving in the X direction and movable body 40A is held at the center, a torsion-resistant and robust structure is achieved and the reliability can be increased. In addition, elastic support parts 351 and 352 are fixed to fixing body 30A, or more specifically base part 32A at both end parts in the width direction (the Y direction). Since they are fixed to the both end parts, the fixation to movable body 40A is easily stabilized, and the degrees of freedom in design can be increased when increasing the spring constant.

Movable body main body 42A is provided with opening 44A where coil 22 of core assembly 20A is disposed. In addition, on the end side and bottom end side including top end part 40a and bottom end part 40b, leg parts 46A and 48A are formed by bending down the end parts. Leg parts 46A and 48A provide the gap from base part 32A to movable body main body 42. This defines the height position of movable body main body 42A of movable body 40A with respect to base part 32A of fixing body 30A.

In the present embodiment, suction part 45A and movable body main body 42A are separate members. Suction part 45A includes fixation plate part 453 fixed to movable body main body 42A, and planar part 454 corresponding to a planar member disposed opposite to magnetic poles 201a and 201b of core assembly 20A.

Suction part 45A is composed of a magnetic material, and, in the present embodiment, formed by bending a metal plate into an L-shape. Planar part 454 is drooped from fixation plate part 453. Fixation plate part 453 is attached at the bottom surface in the vicinity of opening 44A of movable body main body 42A, and planar part 454 drooped from one side portion of opening 44A is provided at movable body main body 42A.

Since suction part 45A is a member separated from movable body main body 42A, the area of the region opposite to magnetic poles 201a and 201b can be readily changed in accordance with the shape of core assembly 20A or the desired output amount.

Core 24 of the magnetic suction force generation part is disposed in the vicinity of magnetic poles 201a and 201b with air gap AG therebetween in the vibration direction along base part 32A such that the magnetic suction force generation part (specifically, magnetic poles 201a and 201b) generates a suction force.

Strain member 80A has a basic configuration similar to that of strain member 80, and is fixed to movable body main body 42A. Strain member 80A includes stopper part 92A in addition to the basic configuration.

Stopper part 92A extends from the surface of strain member 80A making up the surface of vibration actuator 10A to the rear surface base part 32A making up the rear surface of vibration actuator 10A through the side surface.

The portion disposed on the rear surface side of base part 32A at stopper part 92A is stopper part 920. Stopper part 920 faces the main body part of strain member 80A with a predetermined space therebetween, and sandwiches fixing body 30A, i.e., base part 32A in the thickness direction (the Z direction) together with the main body part of strain member 80A.

In this manner, stopper part 920 functions as a stopper that restricts the movement of movable body main body 42A of movable body 40A in the thickness direction with respect to base part 32A of fixing body 30A. In this manner, even in the case where an impact is exerted on vibration actuator 10A, damages can be prevented and the reliability can be improved.

In addition, in vibration actuator 10A, elastic support part 350 is disposed in the direction orthogonal to the vibration direction, connected to base part 32A at fixing part side fixing part 350b at both end parts, and joined to movable body main body 42A at center portion 350a.

As described above, at end part of 40a and bottom end part 40b of movable body 40, elastic support part 350 is fixed to fixing body 30A at both end parts (fixing part side fixing part) 350b separated in the direction orthogonal to both the vibration direction and the thickness direction, and supports movable body main body 42A at center portion 350a.

Since elastic deformation part 350c can be appropriately changed by changing fixing body 30A of elastic support part 350 and the fixation region of movable body 40A, the fixation of movable body 40A is easily stabilized, and the degrees of freedom in design of can be increased when increasing the spring constant. That is, even in the case where more strong vibration is provided by using it as a vibration presentation device and approximating the excellent frequency for human touch and the resonance frequency, the resonance frequency can be set by adjusting the spring constant in a wide adjustment range in accordance with the movable body mass.

In addition, since elastic support part 350 is integrated with base part 32A, it is possible to ensure the improved of assemblability, the improved of assembly accuracy, cost reduction of actuator main body A1 and vibration actuator 10A.

In addition, in elastic support part 350, the fixing position on movable body 40A side is a center portion at end part of 40a and bottom end part 40b of movable body 40, and therefore the movement of movable body 40A is restricted at the fixed center portion. That is, since the movement is restricted at a center portion in the direction (the Y direction) orthogonal to the vibration direction and the thickness direction, movable body 40A can be highly linearly driven and movable body 40A is held at the center. Thus, a torsion-resistant and robust structure is achieved and the reliability can be increased. As a result, there is no reduction in stiffness in the torsional direction, and there is no adverse effect on impact resistance and anti-vibration characteristics. By achieving highly linear vibration, the design of gaps in the moving range of the peripheral parts of movable body 40A becomes easier.

Embodiment 3

Figure 20:
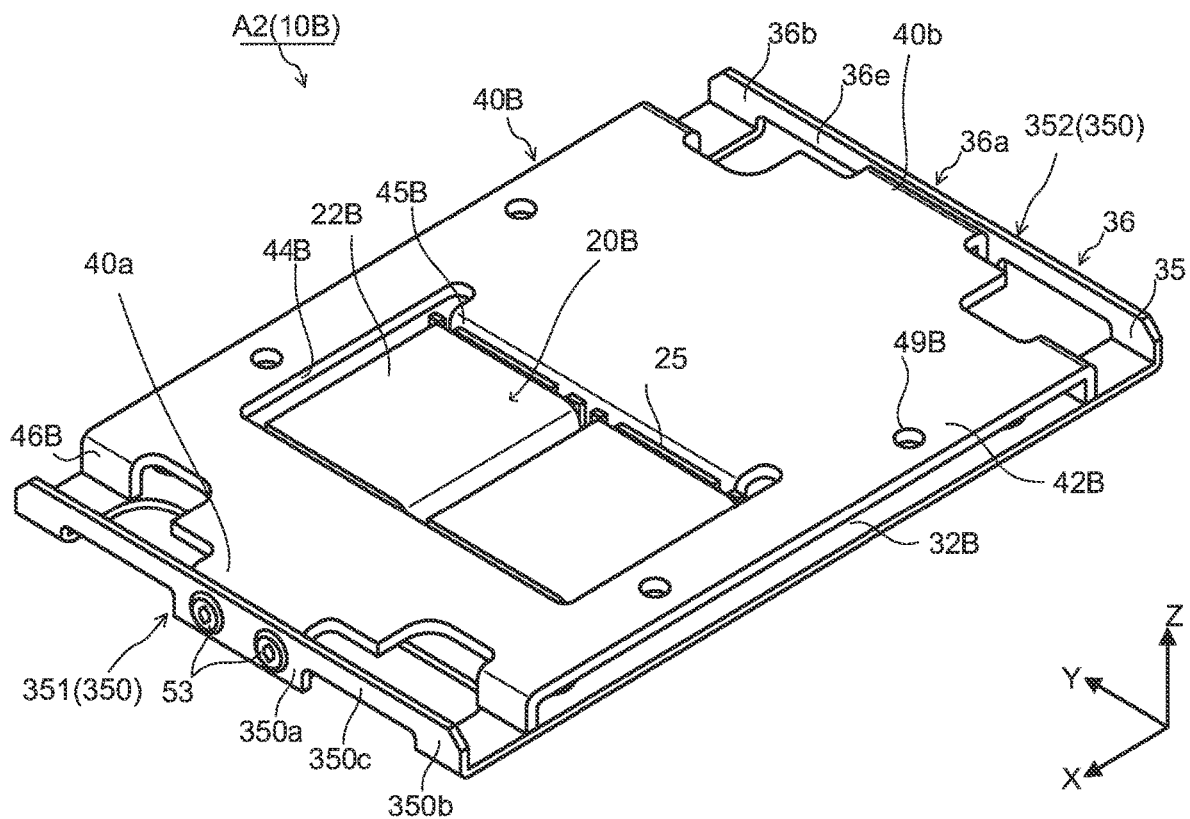
FIG. 20 is a perspective view of an actuator main body illustrating a configuration of a main part of a vibration actuator according to Embodiment 3 of the present invention.
Figure 21:
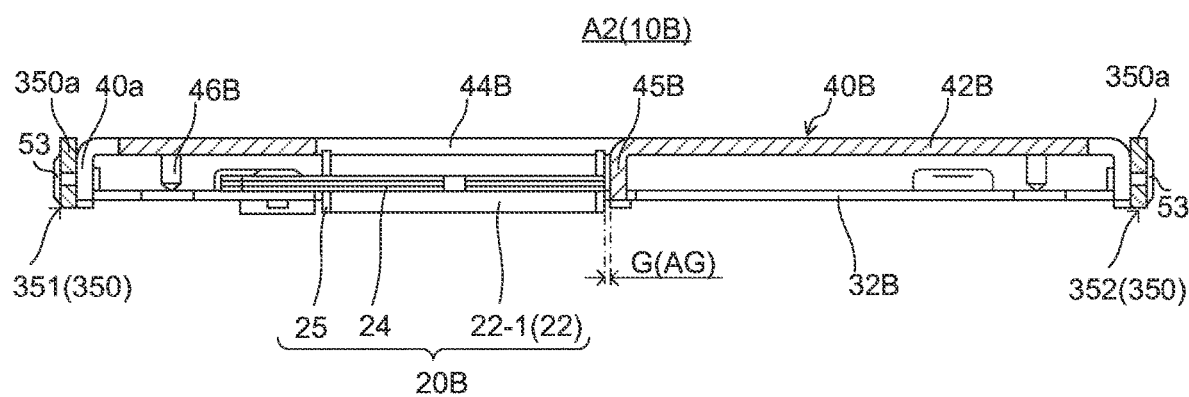
FIG. 21 is a sectional view of a core assembly of an actuator main body illustrating a configuration of a main part of the vibration actuator according to Embodiment 3 of the present invention.
Figure 22:
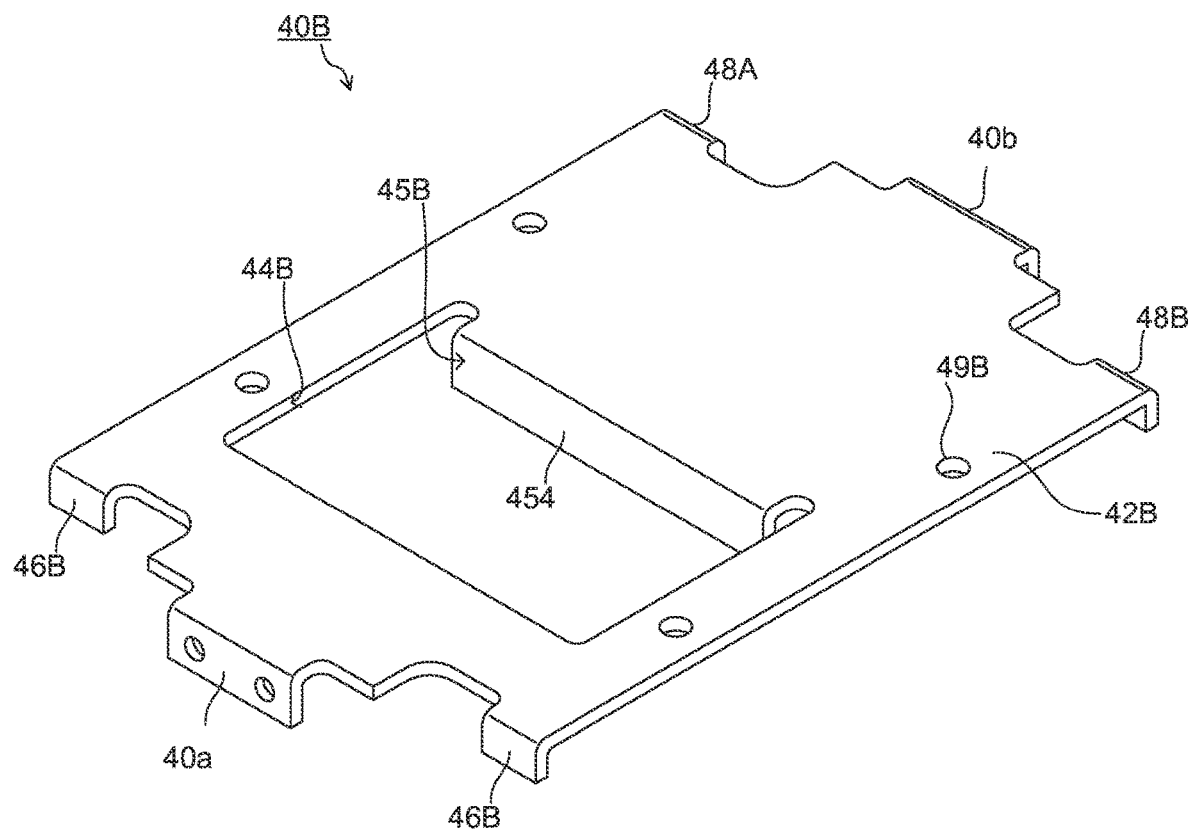
FIG. 22 is a perspective view of a movable body main body of an actuator main body.

FIG. 20 is a perspective view of an actuator main body illustrating a configuration of a main part of the vibration actuator according to Embodiment 3 of the present invention, and FIG. 21 is a sectional view of a core assembly of an actuator main body illustrating a configuration of a main part of the vibration actuator according to Embodiment 3 of the present invention. FIG. 22 is a perspective view of a movable body main body of an actuator main body.

Vibration actuator 10B of Embodiment 3 is different from vibration actuator 10 in the configuration of elastic support part 350, and the configuration of core assembly 20B, and is identical to vibration actuator 10 other basic configurations and functions. It is to be noted that vibration actuator 10B is different from vibration actuator 10A only in the configuration of suction part 45B.

In the following description, the same configurations are denoted with the same reference numeral of vibration actuator 10 with B attached thereto, the same drawing is used, and the description thereof is omitted.

In vibration actuator 10B, the configuration of supporting movable body 40B through elastic support part 350 is joined at a center portion in the width direction (the Y direction and the direction orthogonal to the vibration direction) of movable body 40B in the configuration of vibration actuator 10.

Vibration actuator 10B is different in the configuration in which the elastic support part is integrally provided on fixing body 30 side, or more specifically, the configuration in which base part 32B and elastic support part 350 are integrated, in the configuration of vibration actuator 10.

Vibration actuator 10B includes actuator main body A2 and a load detection module. The load detection module has the same configuration as that of load detection module K1, is fixed to movable body main body 42B of actuator main body A2, and has the same function, and therefore the description thereof is omitted.

Actuator main body A2 includes fixing body 30B including base part 32B and core assembly 20B, and movable body 40B including connecting part 49B connectable to the vibration presentation part and suction part 45B composed of a magnetic material.

As with core assembly 20, core assembly 20B is composed of coil 22B and a core (similar to core 24A) on which coil 22B is wound, but here, coil 22B is wound on bobbin 25 and put on the core (similar to core 24A) with bobbin 25 therebetween.

Suction part 45B is suctioned by the magnetic poles (magnetic suction force generation part) 201a and 201b magnetized at core assembly 20B, and is disposed opposite to magnetic poles 201a and 201b in the vibration direction. Suction part 45B is formed by bending and drooping a part of movable body main body 42B. Suction part 45B is a planar member composed of a magnetic substance, and makes up the magnetic circuit together with core assembly 20B. Suction part 45B is disposed in the vicinity of magnetic poles (magnetic suction force generation part) 201a and 201b of core 24 with air gap AG therebetween in the vibration direction along base part 32B such that magnetic poles (magnetic suction force generation part) 201a and 201b generate suction force.

In vibration actuator 10B, movable body 40B is supported with respect to base part 32B through elastic support part 350 (351, 352) such that it is movable in the vibration direction (the X direction) on base part 32B.

Elastic support parts 351 and 352 are the same as those of base part 32A of Embodiment 1, and therefore the description thereof is omitted. Elastic support parts 351 and 352 are integrally and continuously provided to top end part 32a and bottom end part 32b of base part 32B.

Elastic support part 350 is formed by bending the front-rear end parts of base part 32B formed by processing a sheet metal. Elastic support parts 351 and 352 are fixed to a center portion (top end part 40a and bottom end part 40b) in the width direction (the Y direction) orthogonal to the vibration direction (the X direction) at the front-rear end parts of movable body 40B with respect to movable body 40B. As with elastic support parts 351 and 352 of base part 32A, elastic support parts 351 and 352 are provided integrally with base part 32B, it is possible to ensure the assemblability, assembly accuracy, cost reduction in mounting, i.e., spring-mounting, of elastic support parts 351 and 352.

Embodiment 4

Figure 23:
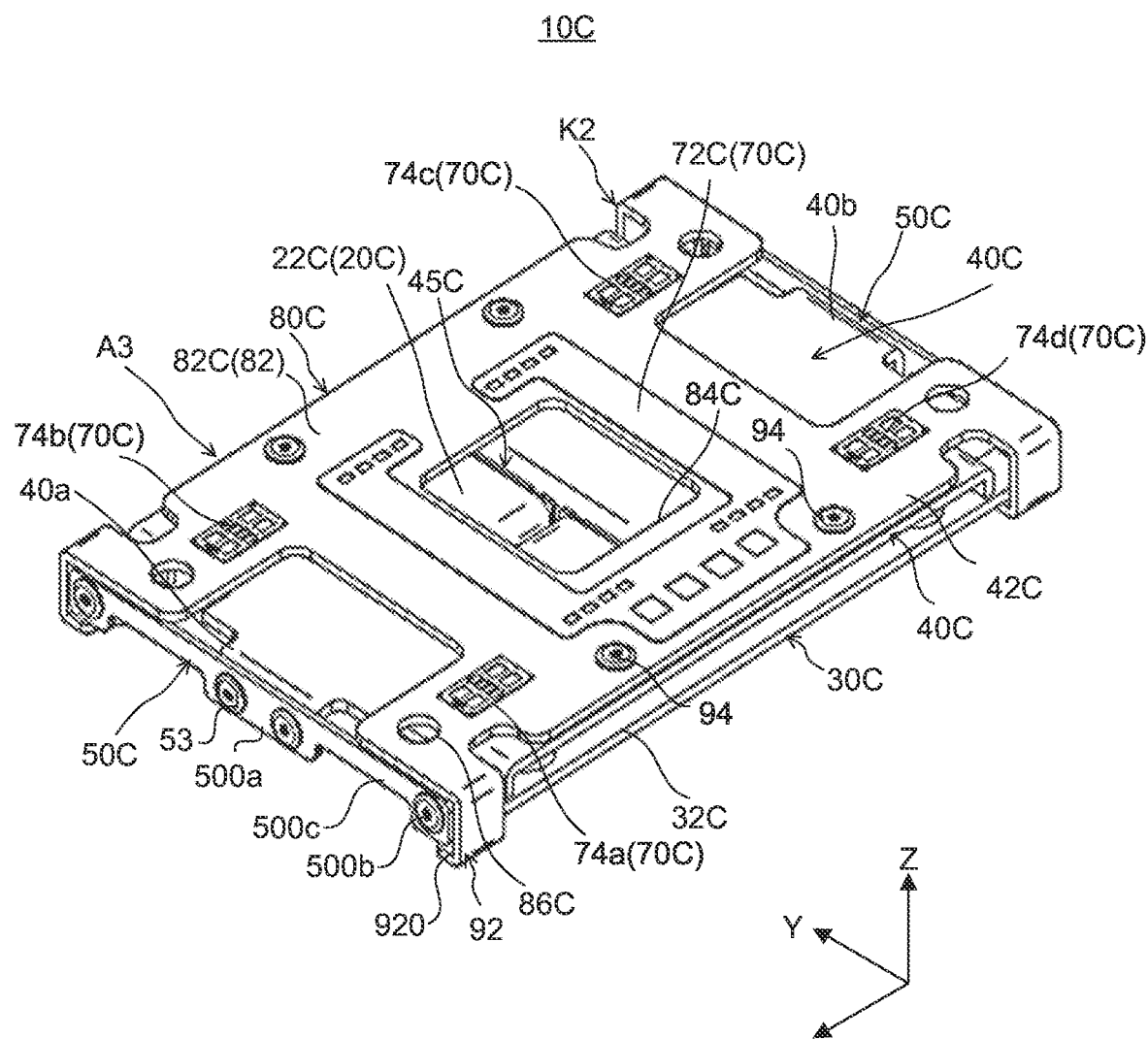
FIG. 23 is a perspective view of an external appearance of a vibration actuator according to Embodiment 4 of the present invention.
Figure 24:
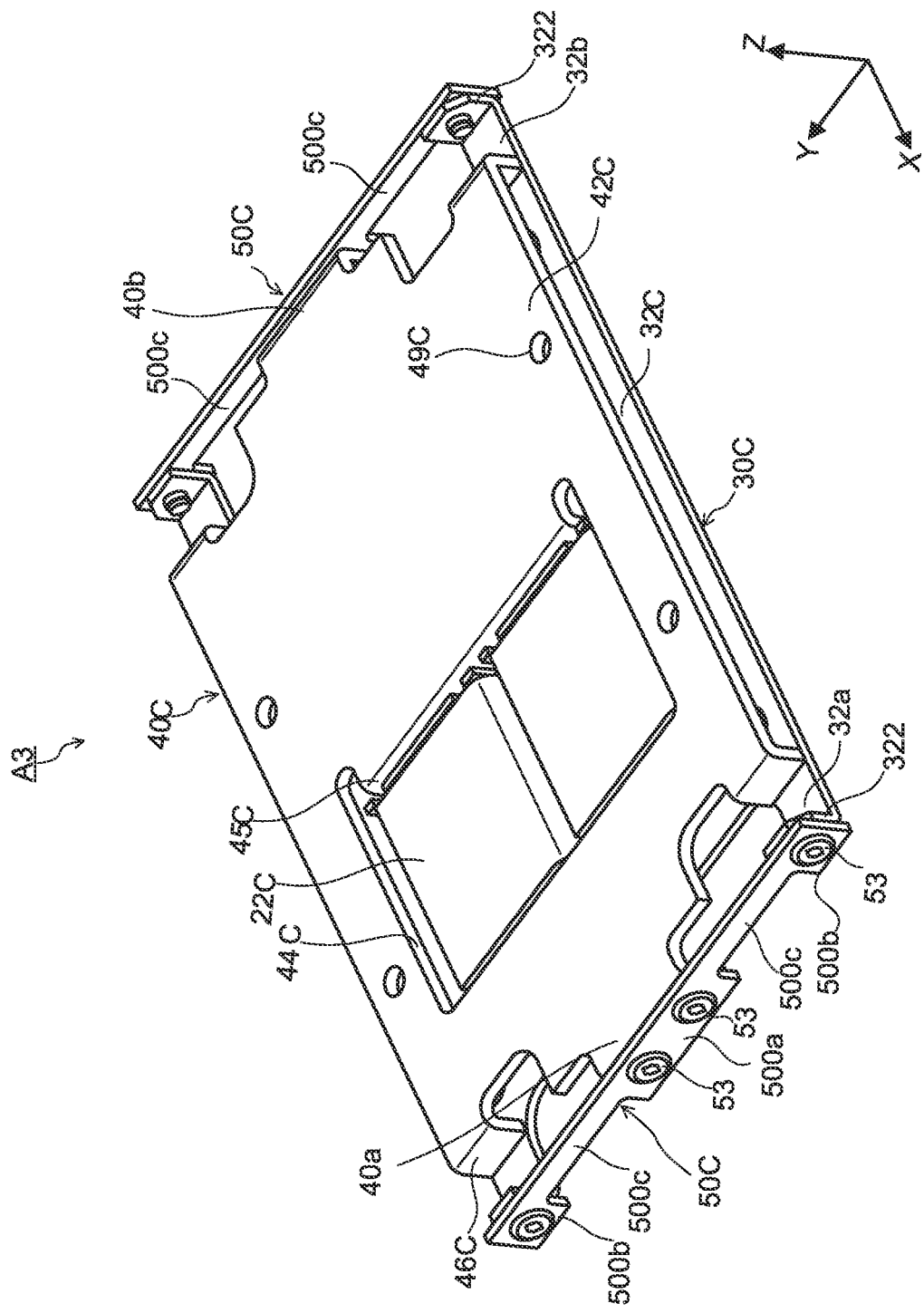
FIG. 24 is a perspective view of an actuator main body illustrating a configuration of a main part of the vibration actuator according to Embodiment 4 of the present invention.
Figure 25:
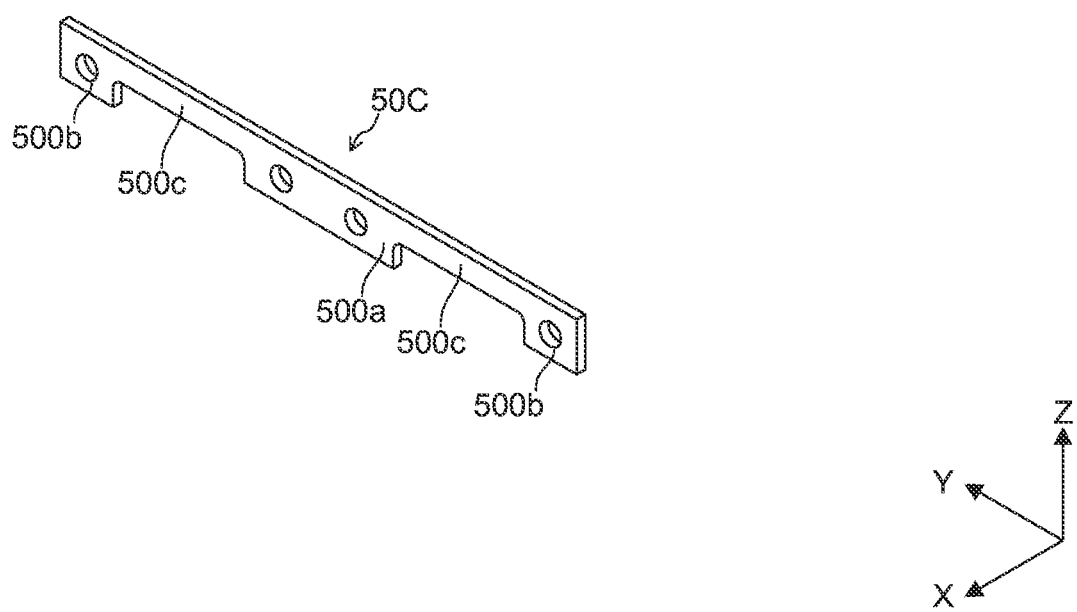
FIG. 25 is a perspective view of an elastic support part of the vibration actuator according to Embodiment 4 of the present invention.

FIG. 23 is a perspective view of an external appearance of a vibration actuator according to Embodiment 4 of the present invention, and FIG. 24 is a perspective view of an actuator main body illustrating a configuration of a main part of the vibration actuator according to Embodiment 4 of the present invention. In addition, FIG. 25 is a perspective view of an elastic support part of the vibration actuator according to Embodiment 4 of the present invention.

Vibration actuator 10C is different from vibration actuator 10 (see FIG. 1) in the configuration in which strain member 80C is provided with stopper part 920 and the shape of elastic support part 50C. In addition, vibration actuator 10C is different from vibration actuator 10A (see FIG. 14) in the configuration of suction part 45C and the configuration of elastic support part 50C, and is identical to vibration actuator 10A in other basic configurations. In the following description, the same configurations are denoted with the same reference numerals with C attached thereto, and the description thereof is omitted.

Vibration actuator 10C includes actuator main body A3 and load detection module K2. Load detection module K2 includes strain member 80C and strain detector 70C provided in strain member 80C, and has a function similar to that of load detection modules K and K1. In the present embodiment, it is similar to load detection module K.

Actuator main body A3 includes fixing body 30C including base part 32C and core assembly 20C, movable body 40C including connecting part 49C (see FIG. 24) that functions as the presentation part connecting part and suction part 45C composed of a magnetic material, and elastic support part 50C.

The magnetic suction force generation part (magnetic poles 201a and 201b) of core assembly 20C and suction part 45C of movable body 40C are disposed close to each other with air gap AG therebetween in the vibration direction such that the magnetic suction force generation part generates a suction force.

Elastic support part 50C is configured as a member separated from fixing body 30C and movable body 40C, and is interposed in an elastically-deformable manner between fixing body 30C and movable body 40C, and thus, movably elastically supports movable body 40C in the vibration direction with respect to fixing body 30C.

As with core assembly 20A (see FIGS. 15 to 17), core assembly 20C is configured in a state where coil 22C is wound on the core by putting bobbin 25 wound on coil 22C on core (omitted in the drawing).

Fixing body 30C includes rectangular plate-shaped base part 32C, and base part 32C is provided with opening 34C where coil 22C is disposed in the opening when core assembly 20C is fixed.

Base part 32C has a shape that allows dismount of elastic support part 350 in the structure of base part 32A (see FIG. 18).

In actuator main body A3 illustrated in FIG. 24, bending piece part 322 for fixing both end parts (fixing body side end part 500b) of elastic support part 50C is provided at top end part of 32a and bottom end part 32b of base part 32C. At this bending piece part 322, the both end parts (500b) of elastic support part 50C is secured with securing member 53.

Elastic support part 50C is disposed along the short direction, i.e., the Y direction at the side surface of vibration actuator 10C. As illustrated in FIG. 25, elastic support part 50C is formed in a slender belt□shape that is provided between bending piece parts 322 separated in the short direction at top end part of 32a and bottom end part 32b of vibration actuator 10C.

Elastic support part 50C includes fixing body side end part 500b provided at both end parts, movable body side end part 500a provided at the center portion, and elastic deformation part 500c provided between fixing body side end part 500b and movable body side end part 500a.

Fixing body side end part 500b is fixed to bending piece part 322 at top end part of 32a and bottom end part 32b of base part 32C. Movable body side end part 500a is fixed to each of end part of 40a and bottom end part 40b of movable body main body 42C. Elastic deformation part 500c is disposed in the direction orthogonal to the vibration direction, deformed in the sheet thickness direction (the X direction as the vibration direction) of elastic deformation part 500c, and relatively displaces fixing body side end part 500b and movable body side end part 500a in the thickness direction of elastic deformation part 500c.

The elastic support part 50C, the fixing position on movable body 40C side is the center of the width direction (the Y direction) of movable body 40C. In this manner, the movement of movable body 40C in the vibration direction (the X direction and the direction orthogonal to the Y direction) is restricted at the center. In this manner, since it is easy to achieve highly linear driving in the X direction and movable body 40C is held at the center, a torsion-resistant and robust structure is achieved and the reliability can be increased.

In addition, elastic support part 50C is fixed to fixing body 30C, or more specifically, base part 32C, at both end parts in the width direction (the Y direction). Since it is fixed at the both end parts, the fixation of movable body 40C is easily stabilized, and the degrees of freedom in design can be increased when increasing the spring constant.

Thus, as with elastic support part 350 of vibration actuator 10B of Embodiment 3, the movable body is easily stabilized, and the degrees of freedom in design of can be increased when increasing the spring constant. That is, even in the case where more strong vibration is provided by using it as a vibration presentation device and approximating the excellent frequency for human touch and the resonance frequency, the resonance frequency can be set by adjusting the spring constant in a wide adjustment range in accordance with the movable body mass.

Embodiment 5

Figure 26:
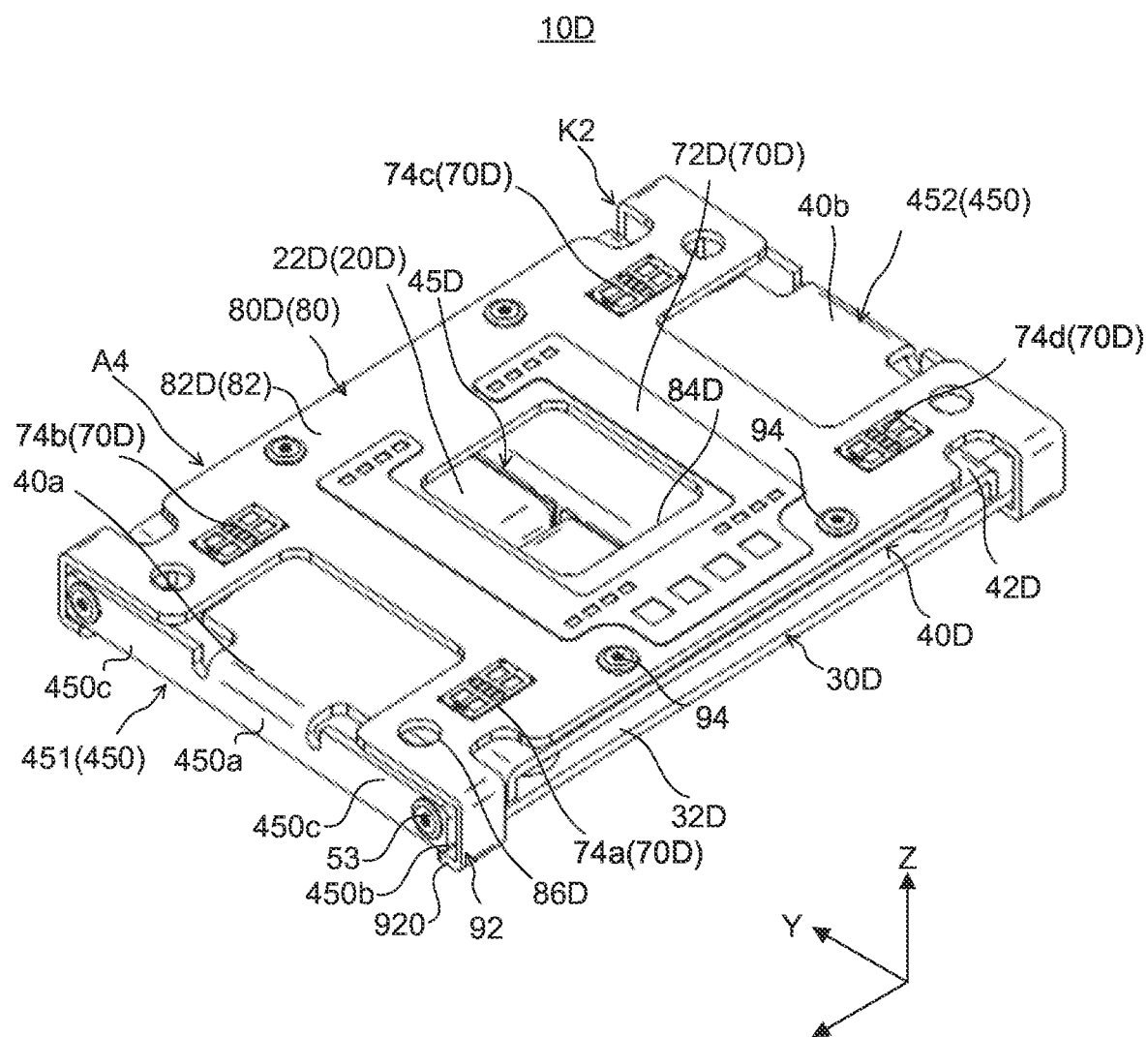
FIG. 26 is a perspective view of an external appearance of a vibration actuator according to Embodiment 5 of the present invention.
Figure 27:
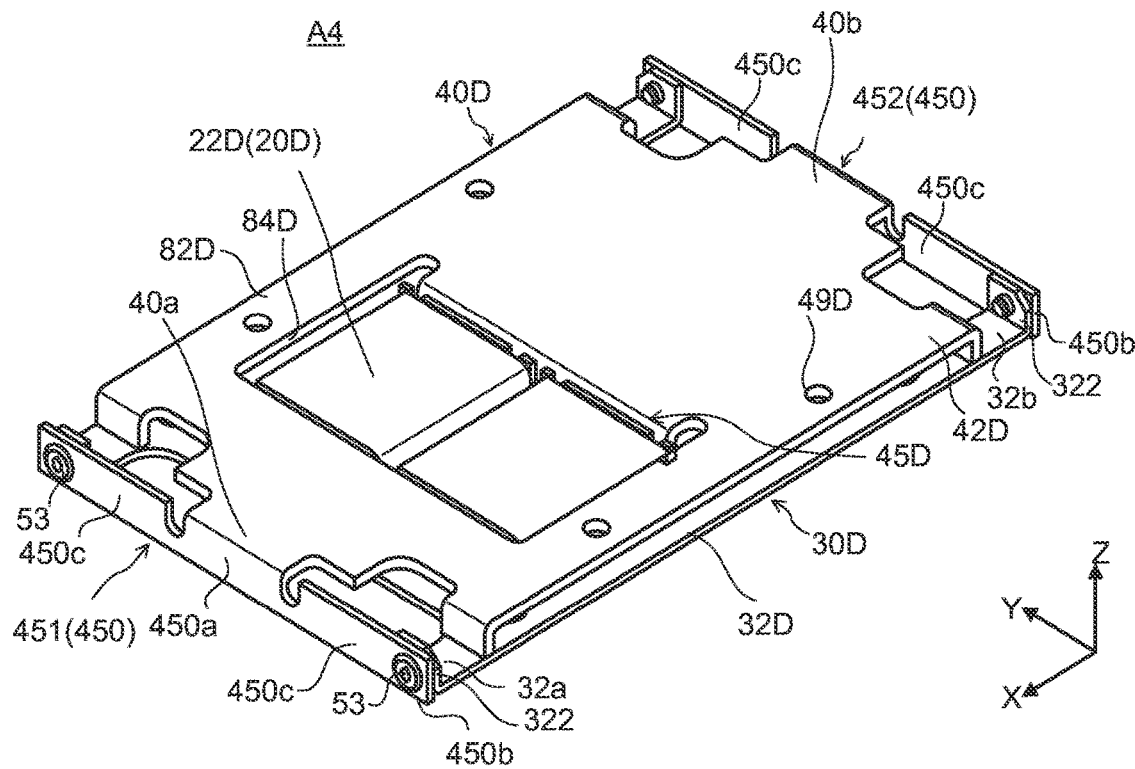
FIG. 27 is a perspective view of an actuator main body illustrating a configuration of a main part of the vibration actuator according to Embodiment 5 of the present invention.
Figure 28:
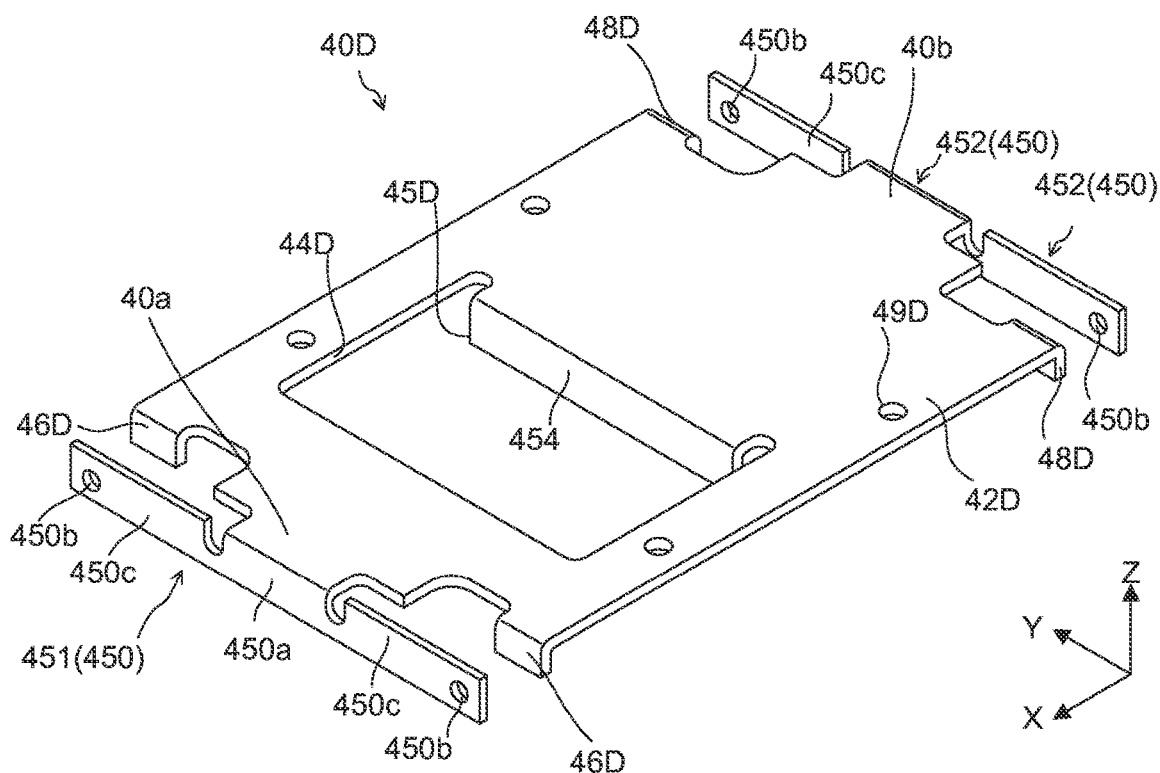
FIG. 28 is a perspective view of a movable body main body of an actuator main body.

FIG. 26 is a perspective view of an external appearance of a vibration actuator according to Embodiment 5 of the present invention, FIG. 27 is a perspective view of an actuator main body illustrating a configuration of a main part of the same vibration actuator, and FIG. 28 is a perspective view of a movable body main body of the same actuator main body.

Vibration actuator 10D illustrated in FIG. 26 to FIG. 28 is mainly different from vibration actuators 10A to 10C in that in the basic configuration, elastic support part 450 is provided on movable body 40D side.

Vibration actuator 10D includes actuator main body A4 and load detection module K2. In actuator main body A4, fixing body 30D includes base part 32D and core assembly 20D. It is to be noted that fixing body 30D has substantially the same basic configuration and function as that of vibration actuators 10 and 10A to 10D of other embodiments. For example, base part 32D is the same as base part 32C.

Base part 32D is configured in a rectangular plate-shape including opening 44D where coil 22D of core assembly 20D is disposed. Bending piece part 322 joined to elastic support part 450 is provided at top end part of 32a and bottom end part 32b of base part 32D. In addition, as with core assemblies 20A to 20C, core assembly 20D is configured in the state where coil 22D is wound on the core (omitted in the drawing) by inserting the core (omitted in the drawing) to bobbin 25 on which coil 22D is wound.

Conversely, as illustrated in FIG. 27 and FIG. 28, in movable body main body 42D of movable body 40D, elastic support part 450 is formed in addition to the configuration including suction part 45D composed of a magnetic material. It is to be noted that movable body main body 42D is provided with connecting part 49D that connects to load detection module K2 to set presentation part connecting part 86D as a part of movable body 40D, and leg parts 46D and 48D drooped from the main body part of movable body main body 42D.

Movable body 40D is provided to be movable back-and-forth in one direction (the X direction) orthogonal to the thickness direction with respect to fixing body 30D.

It is to be noted that in rectangular plate-shaped movable body main body 42D, opening 44D is formed on top end part 40a side, and elastic support part 450 (451, 452) is formed at top end part 40a and bottom end part 40b.

Elastic support part 450 droops downward from top end part 40a and bottom end part 40b of the main body part of movable body main body 42D, and extends in the direction (the Y direction and the width direction) orthogonal to the vibration direction (the X direction) and the thickness direction (the Z direction). Elastic support part 450 has a belt□shape whose height (the length in the Z direction) is the thickness of movable body 40D.

Elastic support part 450 includes center connection part 450a connected to movable body main body 42D at the center in the width direction, fixing body side fixing part 450b at both ends, and elastic deformation part 450c connecting center connection part 450a and fixing body side fixing part 450b. Elastic support part 450 is in the state where movable body 40D is elastically supported at center portion (top end part 40a and bottom end part 40b) in the width direction orthogonal to the vibration direction at the front and rear end parts with respect to base part 32D. In this manner, an operational effect similar to the operational effect of elastic support parts 351 and 352 of Embodiment 2 is achieved.

Elastic deformation part 450c deflects when movable body main body 42D moves in the vibration direction with respect to base part 32D, and a biasing force in the vibration direction with respect to movable body main body 42D is generated. It is to be noted that suction part 45D of the present embodiment is formed by processing and bending a part of movable body main body 42D at right angle to movable body main body 42D, but this is not limitative, and may be formed as a member separated from movable body main body 42D and integrally attached thereto, as with suction part 45A.

In vibration actuator 10D, elastic support part 450 is integrally provided on movable body 40D side, and thus the assemblability and assembly accuracy can be improved, and further cost reduction can be achieved, the configuration of as with vibration actuators 10A and 10B integrally provided on elastic support part fixing body side.

Control of Vibration Actuator

The actuator main body, which is controlled by the control unit, drives an operation device supported in an elastically vibrative manner, in one direction of the vibration direction.

A driving current is supplied to vibration actuator 10 in accordance with a touching operation of the operation device, to generate a magnetic field and move elastically vibrative movable body 40 with respect to fixing body 30 in one direction, here, the plus side of the X direction. In this manner, a vibration as touch feeling is provided to the operator touching the operation device. While the touching operation is a signal detected at strain detection sensor 74 in the present embodiment, a signal representing the contact state input from the vibration presenting part may also be used, for example.

In vibration actuator 10, a single current pulse or multiple current pulses as an actuator drive signal that drives vibration actuator 10 are supplied to coil 22 by the control unit. In the present embodiment, the actuator drive signal is composed of a sequence of multiple current pulses.

When the current pulse is supplied to coil 22, movable body 40 is attracted and displaced by the magnetic suction force to coil 22 side, that is, the plus side in the X direction against the biasing force of elastic support part 50. To follow this movement, the touch feeling presentation part (for example, touch panel) fixed to movable body 40 moves in the plus side in the X direction with respect to the base (omitted in the drawing) where fixing body 30 fixed.

In addition, when the supply of the driving current to coil 22 is stopped, the biasing force is rereleased and the holding state of movable body 40 at the position on the plus side in the X direction with respect to the reference position is released. In this manner, with the biasing force of elastic support part 50, movable body 40 is biased and moved in the direction (the minus side in the X direction) opposite to the attracted direction (the plus side in the X direction) from the maximum displacement position on the plus side in the X direction, thus feeding back the vibration.

The actuator drive signal can be generated as various vibrations depending on the pulse amplitude, wavelength, supply timing and the like of a multiple current pulse sequence or a single current pulse, and can be supplied to actuator main body A. In this manner, the vibration of actuator main body A is provided to the operator as a feeling.

For example, the control unit includes a current pulse supply part and a voltage pulse application part. The current pulse supply part supplies multiple driving current pulses coil 22 of vibration actuator 10 as a driving current for driving the operation device in accordance with the touching operation of the operation device (vibration presenting part).

The voltage pulse application part intermittently applies, to the current pulse supply part, multiple control voltage pulses for generating the single current pulse or the multiple current pulse sequence making up the actuator drive signal.

Figure 29:
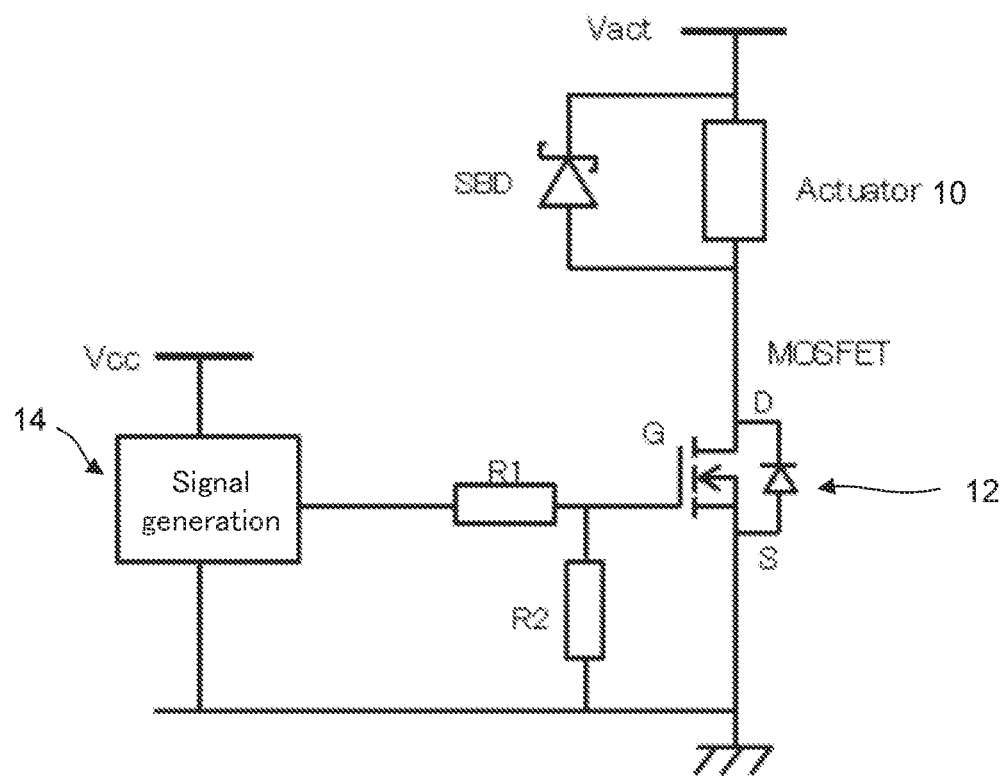
FIG. 29 is a diagram illustrating an example of a driving circuit of the same actuator main body.

FIG. 29 is a diagram illustrating an example of a driving circuit of an actuator main body.

The driving circuit illustrated in FIG. 29 is included in the control unit, switching device 12 serving as a current pulse supply part composed of a metal-oxide-semiconductor field-effect transistor (MOSFET), signal generation part 14 serving as a voltage pulse application part, resistances R1 and R2, and a schottky barrier diodes (SBD).

In the control unit, signal generation part 14 connected to power source voltage Vcc is connected to the gate of switching device 12. Switching device 12 is an electrostatic discharge switch. Switching device 12 is connected to actuator main body A ([Actuator] in FIG. 29) and SBD, and is connected to the vibration actuator, or more specifically, actuator main body A, to which a voltage is supplied from power source part Vact. It is to be noted that actuator main body A may be replaced with any of actuator main bodies A1 to A4.

It is to be noted that although not illustrated in the drawings, the control unit may include a central processing unit (CPU), a read only memory (ROM), and random access memory (RAM) for controlling the operation of the components of the vibration presentation device and the like. The CPU reads the program according to the processing contents from the ROM, expands it to RAM, and controls the operation of the components of the vibration presentation device including the vibration actuator 10 in cooperation with the expanded program. At this time, various data including various vibration damping period generation patterns stored in the memory part (omitted in the figure) are referred to. The memory part (omitted in the figure) may be composed of, for example, a non-volatile semiconductor memory (so-called flash memory). For example, pulse waveform data of various plural patterns of plural pulse trains are stored in the memory part, ROM or RAM. The ROM stores various programs that control the vibration presentation device, including a vibration presentation program that drives the actuator main body A to present the vibration. The vibration presentation program is, for example, a program for reading pulse waveform data for generating an actuator drive signal that generates a vibration corresponding to the contact information when information indicating the contact state is input from the strain detection sensors 74a to 74d.

In addition, the vibration presentation program is, for example, a program for combining read data and generates an actuator drive signal corresponding to contact information, and a program for suppling the generated actuator drive signal to the coil and the like. As a combination of multiple current pulses, the actuator drive signal is applied to coil 22 through a driver for driving actuator main body A. By using the programs and data, the CPU may control the operation of components of the vibration presentation device, and may control the current pulse supply part and the voltage pulse application part. For example, signals from strain detection sensors 74a to 74d is amplified at the amplification part, and analog-digital converted at the conversion part, output to the CPU, so as to vibrate vibration actuator 10 by the driving circuit illustrated in FIG. 29.

The control unit drives movable body 40 in one direction in the vibration direction by supplying a current pulse to coil 22. When a current pulse is supplied to coil 22, movable body 40 displaces in one direction in the vibration direction against the biasing force of elastic support part 50. The displacement of movable body 40 in one direction in the vibration direction is continued during supply of the current pulse. When the supply of the current pulse is stopped, that is, when the input of the current pulse to coil 22 is turned off, the displacing force of movable body 40 in one direction in the vibration direction (the X direction) is released. Turning off of the input of the current pulse means a timing when the voltage that generates the current pulse is set to off. At the time point when the voltage is set to off, the current pulse is not completely off, but is in a state of being attenuated.

With the biasing force of elastic support part 50 accumulated at the maximum displaceable position in the attraction direction (the plus side in the X direction), movable body 40 moves and displaces to the other side in the vibration direction (the minus side in the X direction). A resistant vibration propagates to the operation device through movable body 40 moved to the other side, which is the operation device side, and thus touch feeling is applied to the operator.

On the basis of information from strain detection sensor 74, the control unit supplies one or more current pulses to coil 22 in accordance with a touch of the operator on the touch panel screen. In the vibration of movable body 40, the control unit supplies the first pulse, and, with a pulse supplied after the first pulse, and adjusts a vibration or the like that is continued after the supply of the first pulse is stopped.

Vibration Presentation Device 200

FIG. 31 is a diagram schematically illustrating a vibration presentation device including a vibration actuator. Vibration presentation device 200 is a device that allows the operator touching the vibration presentation part to perform intuitive operation by providing a vibration and feeling to the operator in accordance with a touching operation of the operator on the touch panel screen, for example.

Vibration presentation device 200 includes touch feeling presentation part 210 such as a touch panel, vibration actuator deformation sensor 74 (74a to 74d), amplification part (amplifier) 250, AD conversion part (ADC) 260, microcomputer 220, actuator driver 230, and actuator main body 240.

For example, touch feeling presentation part 210 serving as a touch panel includes a touch position output part (omitted in the drawing) that receives a touching operation of the operator on the touch panel and outputs the touch position. A signal from the touch position output part (omitted in the drawing) is output to microcomputer 220 or the control unit of the entire device. Deformation sensor 74 detects a strain of strain member 80 at load detection module K when touch feeling presentation part 210 is pressed, and the detected signal is input to microcomputer 220 included in the control unit through amplification part 250 and ADC 260.

Microcomputer 220 controls actuator driver 230 such that a vibration corresponding to the touching operation is generated in accordance with the input signal, that is, contact location information from the touch position output part, the drive timing, and the strain signal. That is, through actuator driver 230, microcomputer 220 outputs an actuator drive signal to the actuator (actuator main body A) and supplies a driving current.

Actuator main body A receiving the driving current supplied from actuator driver 230 causes touch feeling presentation part 210 to present a vibration corresponding to the touch position output from touch feeling presentation part 210 by transmitting and vibrating the vibration to touch feeling presentation part 210. In this manner, the operator's operation received at touch feeling presentation part 210 such as a touch panel is received and actuator main body A is driven in accordance with the reception.

When an actuator drive signal is input, actuator main body A moves movable body 40 with a magnetic suction force in one direction, for example, the plus side in the X direction against the biasing force.

In addition, when the input of the actuator drive signal to actuator main body A is stopped, actuator main body A releases the biasing force and moves movable body 40 to the other side (the minus side in the X direction) with the biasing force. Actuator main body A moves movable body 40 and the operation device by the input and stop of the actuator drive signal. Actuator main body A drives movable body 40 without using magnets, and vibrates the operation device.

It is to be noted that in the embodiment, the actuator drive signal corresponds to multiple driving current (also referred to as "current pulses") sequences that is supplied to coil 22 as the driving current for driving the movable body and the operation device. In actuator main body A, when the current pulse is supplied to coil 22, the movable body moves in one direction. By repeating this operation, the movable body is vibrated. The same applies to the vibration actuators 10A to 10D of embodiments 1 to 5, and the movable body is vibrated in the same manner.

In addition, vibration actuators 10 and 10A to 10D of the embodiments include configurations with the same shapes denoted with the same reference numerals, and such configurations have the same operational effects.

The above is a description of an embodiment of the present invention. The above description is an example of a suitable form of the present invention, and the scope of the present invention is not limited thereto. In other words, the above description of the configuration of the device and the shape of each part is an example, and it is clear that various changes and additions to these examples are possible within the scope of the present invention.

INDUSTRIAL APPLICABILITY

The vibration actuators of the present invention are capable of providing vibration in accordance with various contact operation sensations, have the effect of being easy to assemble, and are useful, for example, in operation devices in which operations are input by touching a finger or the like to an image on a screen in in-vehicle products and industrial equipment. Examples of the operation devices include a vibration presentation device such as a touch display device that is equipped with a touch panel device that can feed back the same operation feeling as when touching various images such as mechanical switches displayed on the image.

REFERENCE SIGNS LIST

1 Control unit
10, 10A, 10B, 10C, 10D Vibration actuator
12 Switching device
14 Signal generation part 20, 20A, 20B, 20C, 20D Core assembly
22, 22-1, 22-2, 22A, 22A-1, 22A-2, 22A-3, 22B, 22C, 22D Coil
23 Substrate
24, 24A Core
25 Bobbin
26, 53 Securing member (Screw)
30, 30A, 30B, 30C, 30D Fixing body
30a Base top end part
30b Base bottom end part
32, 32A, 32B, 32C, 32D Base part
32a End part
32b Bottom end part
34, 34A, 34C Opening
36 Connecting part
38 Fixation hole
40, 40A, 40B, 40C, 40D Movable body
40a End part
40b Bottom end part
42 Movable body main body
42A, 42B, 42C, 42D Movable body main body
44, 44A, 44D Opening
45, 45A, 45B, 45C, 45D Suction part
46A, 46D, 48A, 48D Leg part
49B, 49C, 49D Connecting part
50, 51, 52, 350, 351, 352, 450, 451, 452 Elastic support part
50a Second end part
50b First end part
50c Elastic deformation part
50C Elastic support part
54 Nut
70, 70A, 70C Strain detector
72 Substrate
74, 74a, 74b, 74c, 74d Detection sensor (Load sensor)
80, 80A, 80C Strain member
82 Frame part
84 Opening
85 Connection arm part
86, 86A, 86D Presentation part connecting part (connection part)
90 Movement restriction part (Retainer part)
92 Stopper receipt part (Screw receipt part)
92A Stopper part
92a Insertion part
92b Flange part
94 Stopper pin (Screw)
94a Flange part
94b Pin shaft
96 Washer
200 Vibration presentation device
201a, 201b Magnetic pole (Magnetic suction force generation part)
210 Touch feeling presentation part (Vibration presentation part)
210 Touch feeling presentation part
220 Microcomputer
230 Actuator driver
240, A1, A2, A3, A4 Actuator main body
250 Amplification part
321 Through hole
322 Bending piece part
350 Elastic support part
350a Movable body side connecting part
350b Both end parts
350c Elastic deformation part
450a Center connection part
450b Fixing body side fixing part
450c Elastic deformation part
453 Fixation plate part
454 Planar part
500a Movable body side end part
500b Fixing body side end part
500c Elastic deformation part
920 Stopper part
250 Amplification part (Amplifier)
260 AD conversion part
K, K1, K2, K3, K4 Load detection module
R-A1, R-A2, R-A3, R-A4, R-B1, R-B2, R-B3, R-B4, R-C1, R-C2, R-C3, R-C4, R-D1, R-D2, R-D3, R-D4 Strain gauge part
SBD Resistance
G Gap
AG Air gap

The invention claimed is:

1. A vibration actuator configured to apply a vibration to a connected vibration presentation part, the vibration actuator comprising:
a fixing body including a base part composed of a non-magnetic substance, and a magnetic suction force generation part provided at a core on which a coil is wound, the base part having a planar shape;
a movable body including a connecting part connectable to the vibration presentation part, and a suction part composed of a magnetic material configured to be suctioned by the magnetic suction force generation part through energization to the coil, the movable body having a plate-shape and disposed on the base part; and
a plurality of elastic support parts configured to support the movable body with respect to the fixing body such that the movable body is sandwiched from a vibration direction along a surface of the base part and that the movable body is movable in the vibration direction,
wherein the suction part is disposed in a vicinity of a magnetic pole of the core of the magnetic suction force generation part with an air gap between the suction part and the magnetic pole in the vibration direction, and the suction part is disposed at a center portion in the vibration direction of the movable body supported by the plurality of elastic support parts.

2. The vibration actuator according to claim 1,
wherein the base part includes an opening;
wherein the core is fixed to the base part from a bottom surface side of the base part; and
wherein in the opening, the coil and the magnetic suction force generation part are disposed, and the suction part is movably disposed.

3. The vibration actuator according to claim 1,
wherein the movable body includes a movable body main body including the connecting part and having a plate-shape; and
wherein the suction part includes a planar member configured to be fixed to the movable body main body and including a surface configured to face the magnetic suction force generation part.

4. The vibration actuator according to claim 1,
wherein the movable body includes a movable body main body including the connecting part, the movable body main body being composed of a sheet metal made of a magnetic substance; and
wherein the suction part is configured by bending a part of the movable body main body such that the suction part faces the magnetic suction force generation part.

5. The vibration actuator according to claim 1, wherein the movable body is provided with a load sensor configured to detect a load from the vibration presentation part.

6. The vibration actuator according to claim 5, wherein the load sensor is a strain detection sensor.

7. The vibration actuator according to claim 1, wherein the core is a core with a C-shape.

8. The vibration actuator according to claim 1, wherein the core is a core with an E-shape.

9. A vibration presentation device comprising a touch panel in which the vibration actuator according to claim 1 is mounted.

\* \* \* \* \*